US012544252B2

(12) United States Patent
Olsen et al.

(10) Patent No.: US 12,544,252 B2
(45) Date of Patent: Feb. 10, 2026

(54) MONITOR DEVICE WITH SENSOR CLASSIFIER FOR A PERSONAL CARE SYSTEM, AND RELATED METHODS

(71) Applicant: Coloplast A/S, Humlebaek (DK)

(72) Inventors: Jesper Kenneth Olsen, Birkeroed (DK); Jonas Emborg, Frederikssund (DK); Jose Manuel Roman-Marin, Copenhagen N (DK); Lars F. Molzen, Alleroed (DK)

(73) Assignee: Coloplast A/S, Humlebaek (DK)

( * ) Notice: Subject to any disclaimer, the term of this patent is extended or adjusted under 35 U.S.C. 154(b) by 357 days.

(21) Appl. No.: 18/031,883

(22) PCT Filed: Oct. 14, 2021

(86) PCT No.: PCT/DK2021/050307
§ 371 (c)(1),
(2) Date: Apr. 14, 2023

(87) PCT Pub. No.: WO2022/078561
PCT Pub. Date: Apr. 21, 2022

(65) Prior Publication Data
US 2023/0410996 A1 Dec. 21, 2023

(30) Foreign Application Priority Data
Oct. 14, 2020 (DK) .......................... PA 2020 70690

(51) Int. Cl.
*A61F 5/44* (2006.01)
*A61F 5/445* (2006.01)
(Continued)

(52) U.S. Cl.
CPC ............ *A61F 5/4404* (2013.01); *A61F 5/445* (2013.01); *G16H 40/63* (2018.01); *G16H 20/40* (2018.01)

(58) Field of Classification Search
CPC ........ G16H 40/63; G16H 20/40; G16H 20/30; A61F 5/4404; A61F 5/445
See application file for complete search history.

(56) References Cited

U.S. PATENT DOCUMENTS

2019/0192332 A1 6/2019 Hansen et al.
2021/0369489 A1* 12/2021 Hansen ................. A61F 5/4404

FOREIGN PATENT DOCUMENTS

WO 2019120425 A1 6/2019
WO 2019120429 A1 6/2019
(Continued)

*Primary Examiner* — Susan S Su
(74) *Attorney, Agent, or Firm* — Coloplast Corp., Coloplast A/S; Nick Baumann

(57) ABSTRACT

Monitor device of a personal care system, devices of a personal care system and related methods are disclosed. The monitor device comprises a processor; a memory connected to the processor; a first interface connected to the processor, the first interface configured for connecting the monitor device to the personal care appliance; and a second interface comprising a transceiver module connected to the processor and configured for connecting the monitor device to the accessory device of the personal care system, wherein the monitor device is configured to obtain first sensor data from a first sensor of the personal care appliance; obtain second sensor data from a second sensor of the personal care appliance; determine a first sensor state of the first sensor based on the first sensor data; determine a second sensor state of the second sensor based on the second sensor data; and output a first sensor state identifier indicative of the first sensor state and a second sensor state identifier indicative of the second sensor state.

15 Claims, 10 Drawing Sheets

(51) Int. Cl.
  *G16H 40/63* (2018.01)
  *G16H 20/40* (2018.01)

(56) References Cited

FOREIGN PATENT DOCUMENTS

| | | | |
|---|---|---|---|
| WO | WO-2019120450 A1 * | 6/2019 | ............... A61F 5/44 |
| WO | 2019174687 A1 | 9/2019 | |
| WO | 2019174693 A1 | 9/2019 | |
| WO | 2019174694 A1 | 9/2019 | |
| WO | 2019174695 A1 | 9/2019 | |
| WO | 2019174697 A1 | 9/2019 | |

* cited by examiner

MONITOR DEVICE WITH SENSOR CLASSIFIER FOR A PERSONAL CARE SYSTEM, AND RELATED METHODS

The present disclosure relates to a personal care system, devices thereof including a monitor device and an accessory device, and related methods. In particular, a monitor device with sensor classifier and related method is disclosed. The personal care system comprises a personal care appliance, such as an ostomy appliance or a wound dressing, and a monitor device. The present disclosure relates to operation of a monitor device and handling of sensor data from the personal care appliance.

BRIEF DESCRIPTION OF THE DRAWINGS

The accompanying drawings are included to provide a further understanding of embodiments and are incorporated into and a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

Figure 1:
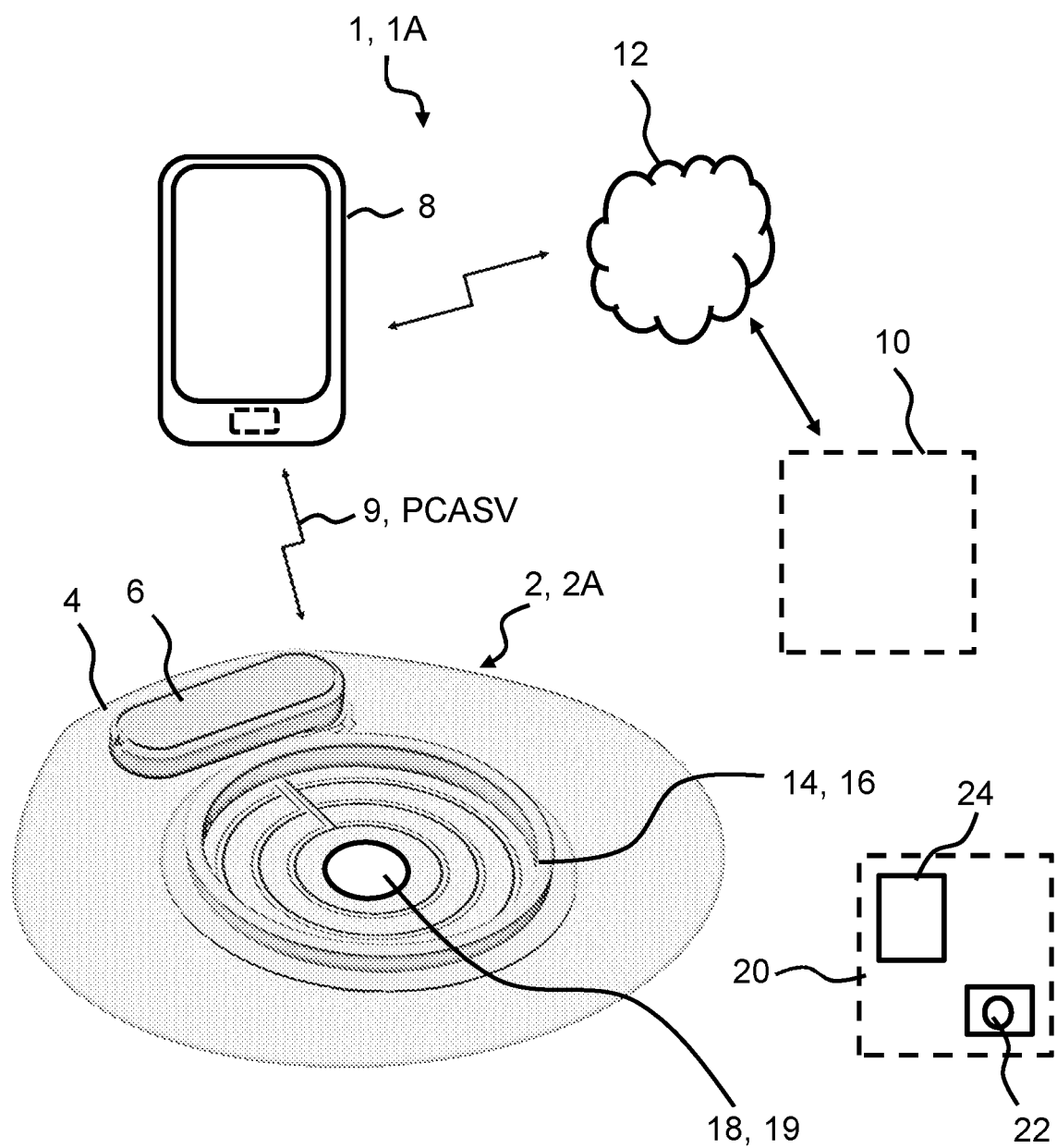
FIG. 1 illustrates an exemplary personal care system being an ostomy system.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout this disclosure, the words "stoma" and "ostomy" are used to denote a surgically created opening bypassing the intestines or urinary tract system of a person. The words are used interchangeably, and no differentiated meaning is intended. The same applies for any words or phrases derived from these, e.g., "stomal", "ostomies" etc. Also, the solid and liquid wastes emanating from the stoma may be referred to as both stomal "output," "waste(s)," and "fluids" interchangeably. A subject having undergone ostomy surgery may be referred to as "ostomist" or "ostomate"—moreover, also as "patient" or "user". However, in some cases "user" may also relate or refer to a health care professional (HCP), such as a surgeon or an ostomy care nurse or others. In those cases, it will either be explicitly stated, or be implicit from the context that the "user" is not the "patient" him- or herself.

In the following, whenever referring to proximal side or surface of a layer, an element, a device or part of a device, the referral is to the skin-facing side or surface, when a user wears the ostomy appliance. Likewise, whenever referring to the distal side or surface of a layer, an element, a device or part of a device, the referral is to the side or surface facing away from the skin, when a user wears the ostomy appliance/wound dressing appliance. In other words, the proximal side or surface is the side or surface closest to the user, when the appliance is fitted on a user and the distal side is the opposite side or surface—the side or surface furthest away from the user in use.

The axial direction is defined as the direction of the stoma, when a user wears the appliance. Thus, the axial direction is generally perpendicular to the skin or abdominal surface of the user.

The radial direction is defined as perpendicular to the axial direction. In some sentences, the words "inner" and "outer" may be used. These qualifiers should generally be perceived with respect to the radial direction, such that a reference to an "outer" element means that the element is farther away from a centre portion of the ostomy appliance or wound dressing than an element referenced as "inner". In addition, "innermost" should be interpreted as the portion of a component forming a centre of the component and/or being adjacent to the centre of the component. In analogy, "outermost" should be interpreted as a portion of a component forming an outer edge or outer contour of a component and/or being adjacent to that outer edge or outer contour.

The use of the word "substantially" as a qualifier to certain features or effects in this disclosure is intended to simply mean that any deviations are within tolerances that would normally be expected by the skilled person in the relevant field.

The use of the word "generally" as a qualifier to certain features or effects in this disclosure is intended to simply mean—for a structural feature: that a majority or major portion of such feature exhibits the characteristic in question, and—for a functional feature or an effect: that a majority of outcomes involving the characteristic provide the effect, but that exceptionally outcomes do not provide the effect.

The present disclosure relates to a personal care system and devices thereof, such as a personal care appliance, an electrode assembly, a monitor device, and optionally one or more accessory devices. Further, methods related to the personal care system and devices thereof are disclosed. An accessory device (also referred to as an external device) may be a mobile phone or other handheld device, such as a tablet computer. An accessory device may be a personal electronic device, e.g. a wearable, such as a watch or other wrist-worn electronic device. An accessory device may be a docking station. The docking station may be configured to electrically and/or mechanically couple the monitor device to the docking station. The docking station may be configured for charging the monitor device and/or configured for transferring data between the monitor device and the docking station. The personal care system may comprise a server device. The server device may be operated and/or controlled by the personal care appliance manufacturer and/or a service centre.

The present disclosure provides a personal care system and devices thereof, such as a personal care appliance, e.g. an ostomy appliance or a wound dressing, a monitor device, and optionally one or more accessory devices which either alone or together facilitate reliable determination and monitoring of the nature, severity and rapidness of moisture propagation in the personal appliance, such as in an adhesive material provided for attaching a base plate of an ostomy appliance to the skin surface of a user or in an absorbent core of the wound dressing.

The personal care system may be an ostomy system. Thus, the personal care appliance may be an ostomy appliance.

The personal care system may be a wound dressing system. Thus, the personal care appliance may be a wound dressing appliance also denoted a wound dressing. A wound dressing system and devices thereof are provided, such as a wound dressing, a monitor device, and optionally one or more accessory devices which either alone or together facilitate reliable monitoring of the wound dressing and operating state thereof. Accordingly, the wound dressing system and devices thereof enable providing information to the user about the operating state of the wound dressing, and in turn optionally enable providing an indication to the user or a caretaker of the remaining time frame for replacing the wound dressing without experiencing leakage and/or to provide optimum wound healing conditions.

The personal care system may be a catheter system. Thus, the personal care appliance may be a catheter appliance.

The personal care system comprises one or more of a personal care appliance, a monitor device, and one or more accessory devices as described herein.

Depending on the nature of the pattern of moisture propagation in the personal care appliance, the personal care system and devices thereof enable providing information to the user about the status and/or a type of failure, and in turn enable providing an indication to the user of the severity and thus the remaining time frame for replacing the personal care appliance without experiencing severe leakage and/or skin damage and/or to improve wound healing.

In particular, the present disclosure provides for improved, e.g., power efficient, data transfer between a monitor device and an accessory device by optimizing the size and content of a data vector transmitted from the monitor device to the accessory device. Further, the present disclosure facilitates using the same accessory device independent on the specific measurement levels and detection principles applied in the monitor device. In other words, a standardized and/or protocolized data interface between the monitor device and the accessory device is provided. Thereby, the need for updating accessory device(s) when a change is made in the monitor device and/or sensor configuration of a personal care appliance is reduced. Thus, increased design flexibility when designing and/or updating devices of the personal care system is provided.

The ostomy appliance comprises a base plate and an ostomy pouch (also referred to as an ostomy bag). The ostomy appliance may be a colostomy appliance, an ileostomy appliance or a urostomy appliance. The ostomy appliance may be a two-part ostomy appliance, i.e. the base plate and the ostomy pouch may be releasably coupled e.g. with a mechanical and/or an adhesive coupling, e.g. to allow that a plurality of ostomy pouches can be utilized (exchanged) with one base plate. Further, a two-part ostomy appliance may facilitate correct application of the base plate to skin, e.g. to an improved user sight of the stomal region. The ostomy appliance may be a one-part ostomy appliance, i.e. the base plate and the ostomy pouch may be fixedly attached to each other. The base plate is configured for coupling to a user's stoma and/or skin surrounding the stoma, such as a peristomal skin area. The ostomy appliance may comprise an electrode assembly or the ostomy system optionally comprises an electrode assembly mountable on a proximal side of the base plate of the ostomy appliance. The electrode assembly, also denoted sensor assembly or sensor patch, comprises a plurality of electrodes optionally arranged on a distal side of a first adhesive layer of the ostomy appliance or on a distal side of a first adhesive layer of the electrode assembly, the plurality of electrodes forming a plurality of sensors (electrode pairs). In particular, the sensor patch may be an accessory for application to a base plate, such as the proximal surface of the base plate. Thereby, an arbitrary base plate, such as a conventional base plate, can achieve the sensing features as described herein. Thus, features as described with respect to sensing/monitoring capabilities of the base plate herein can be provided by a separate electrode assembly in the shape/form of a sensor patch to be applied to a base plate, e.g., by the user, and vice versa. Thus, the sensor patch may form part of the ostomy appliance. In embodiments, the sensor patch is adapted to adhere to a base plate. In embodiments, the sensor patch comprises an adhesive for adhesion to at least a skin surface.

In other words, the ostomy appliance may comprise one or more sensors including a first sensor, optionally a second sensor and optionally a third sensor. The one or more sensors of the ostomy appliance may be arranged in or at the first adhesive layer. The ostomy appliance/electrode assembly may comprise a monitor interface for connecting electrodes or sensors of the electrode assembly to terminals of the first interface of the monitor device.

The wound dressing appliance comprises a top layer, a first adhesive layer with a proximal surface configured for attachment of the wound dressing to the skin surface of a user; an absorbent core layer; and an electrode assembly comprising a plurality of electrodes optionally arranged on a distal side of the absorbent core layer, the plurality of electrodes forming a plurality of sensors (electrode pairs). The top layer is optionally on a distal side of the electrode assembly. In other words, the wound dressing may comprise one or more sensors including a first sensor, optionally a second sensor and optionally a third sensor. The wound dressing may comprise a monitor interface for connecting electrodes or sensors of the electrode assembly to terminals of the first interface of the monitor device.

A monitor device for a personal care system comprising a personal care appliance, the monitor device, and one or more accessory devices is disclosed, the monitor device comprising a processor; a memory connected to the processor; a first interface connected to the processor, the first interface configured for connecting the monitor device to the personal care appliance; and a second interface comprising a transceiver module connected to the processor and configured for connecting the monitor device to the accessory device of the personal care system. The monitor device is configured to obtain first sensor data, e.g., from a first sensor of the personal care appliance, and/or obtain second sensor data, e.g., from a second sensor of the personal care appliance, and determine one or more sensor states, optionally including to determine a first sensor state of the first sensor based on the first sensor data and/or determine a second sensor state of the second sensor based on the second sensor data. The monitor device is optionally configured to output a first sensor state identifier indicative of the first sensor state and/or a second sensor state identifier indicative of the second sensor state. In other words, the monitor device is optionally configured to output one or more sensor state identifiers indicative of sensor state(s) of respective sensor(s) of the personal care appliance.

A method of operating a monitor device for a personal care system comprising a personal care appliance, the monitor device, and an accessory device is disclosed, the method comprising obtaining sensor data from one or more sensors of the personal care appliance including obtaining first sensor data from a first sensor of the personal care appliance and/or obtaining second sensor data from a second sensor of the personal care appliance; determining one or more sensor states optionally including determining a first sensor state of the first sensor based on the first sensor data and/or determining a second sensor state of the second sensor based on the second sensor data; and outputting one or more sensor state identifiers including a first sensor state identifier indicative of the first sensor state and/or a second sensor state identifier indicative of the second sensor state.

An accessory device for a personal care system comprising a personal care appliance, a monitor device, and the accessory device is provided, the accessory device comprising a processor; a memory connected to the processor; and an interface configured to connect the accessory device to the monitor device, the interface comprising a transceiver module connected to the processor. The accessory device is configured to obtain a first sensor state identifier indicative of a sensor state of a first sensor of the personal care appliance and/or obtain a second sensor state identifier indicative of a sensor state of a second sensor of the personal care appliance. The accessory device is configured to determine an operating state of the personal care appliance based on the first sensor state identifier and/or the second sensor state identifier; and communicate the operating state of the personal care appliance via the interface, such as via a display of the interface.

The monitor device is configured to obtain sensor data from one or more, such as a plurality of sensors, of a personal care appliance, e.g., via terminals of the first interface of the monitor device. The personal care appliance may comprise a plurality of sensors, such as three or more sensors, including a first sensor and/or a second sensor. The personal care appliance may comprise a third sensor and/or a fourth sensor. The personal care appliance may comprise a fifth sensor and/or a sixth sensor. The sensor data of a sensor may comprise primary sensor data indicative of a voltage or resistance measured over the sensor. The sensor data of a sensor may comprise secondary sensor data indicative of a capacitance measured over the sensor.

The monitor device is configured to determine one or more sensor states $SS\_1, \ldots SS\_M$ of respective one or more sensors $S\_1, \ldots S\_M$ of the personal care appliance, e.g., of respective one or more sensors embedded in a base plate of an ostomy appliance and/or of respective one or more sensors embedded in a wound dressing. M is the number of sensors and may be in the range from 2 to 10 or even larger than 10. In one or more examples, the number M of sensors is in the range from 3 to 7. In one or more examples, a single sensor may be used, i.e., M may be 1. The monitor device may be configured to determine sensor state(s) by respective sensor state machine(s) applied to the respective sensor data. Thus, the monitor device is optionally configured to determine a first sensor state $SS\_1$ of the first sensor $S\_1$, e.g., based on the first sensor data $SD\_1$ and/or determine a second sensor state $SS\_2$ of the second sensor $S\_2$, e.g., based on the second sensor data $SD\_2$. The monitor device may be configured to determine sensor states at a sensor state frequency, e.g., in the range from 0.01 Hz to 1 Hz. In one or more monitor devices, the sensor state frequency may be from 0.05 Hz to 0.2 Hz, such as 0.1 Hz, e.g., in the range from 0.01 Hz to 1 Hz. In other words, the monitor device may be configured to determine sensor state(s) every 5 to 20 seconds, such as every 10 seconds.

The monitor device is configured to output, such as wirelessly transmit via the second interface, one or more sensor state identifiers, e.g., a first sensor state identifier $SSI\_1$ indicative of the first sensor state $SS\_1$ and/or a second sensor state identifier $SSI\_2$ indicative of the second sensor state $SS\_2$. To output one or more sensor state identifiers may comprise to include the one or more sensor state identifiers in a personal care appliance status vector also denoted PCASV and transmit, such as wirelessly transmit, the personal care appliance status vector via the second interface of the monitor device.

In one or more exemplary monitor devices/methods of operating a monitor device, to determine a first sensor state based on the first sensor data comprises selecting the first sensor state from at least three sensor states or more than three sensor states. The first sensor state may be selected from a set of sensor states comprising in the range from three to ten sensor states, such as from four, five, or six sensor states.

In one or more exemplary monitor devices/methods of operating a monitor device, to determine a second sensor state based on the second sensor data comprises selecting the second sensor state from at least three sensor states or more than three sensor states. The second sensor state may be selected from a set of sensor states comprising in the range from three to ten sensor states, such as from four, five, or six sensor states.

The monitor device may be configured to obtain third sensor data $SD\_3$, e.g., from a third sensor $S\_3$ of the personal care appliance, and optionally determine a third sensor state $SS\_3$ of the third sensor $S\_3$, e.g., based on the third sensor data. The monitor device is optionally configured to output, such as wirelessly transmit via the second interface, a third sensor state identifier $SSI\_3$ indicative of the third sensor state $SS\_3$.

In one or more exemplary monitor devices/methods of operating a monitor device, to determine a first sensor state comprises setting the first sensor state to a default state, e.g., by setting $SS\_1=0$; determining if a first criterion is satisfied; and in accordance with the first criterion being satisfied, setting the first sensor state to a first state, e.g., by setting $SS\_1=1$. Thus, the monitor device may be configured to, when the first sensor is in a default state ($SS\_1=0$), determine if a first criterion is satisfied; and in accordance with the first criterion being satisfied, set the first sensor state to a first state, e.g., by setting $SS\_1=1$. The default state may also be denoted a starting state or an initial state. The default state may be denoted a dry state, i.e., indicative of the first sensor being dry. The first state may be a leak state, e.g., indicative of the first sensor detecting a leak or presence of liquid, output or body fluid.

In one or more exemplary monitor devices/methods of operating a monitor device, determining if a first criterion is satisfied comprises determining a primary parameter based on the first sensor data; optionally updating a primary value based on the primary parameter; and wherein the first criterion is based on the primary value and/or the primary parameter. The primary value may be a flag, e.g., set according to a secondary state machine used for updating/determining the primary value and/or a primary counter. The first criterion may be based on the primary counter. Determining/updating a primary parameter, a primary value, and primary counter may be performed before, after and/or as part of determining sensor state(s).

In other words, the monitor device may be configured to determine a primary parameter PP_i based on the i'th sensor data SD_i and optionally updating a primary value PV_i based on the primary parameter PP_i and/or updating/determining a primary counter PC_i based on the primary parameter PP_i and/or the primary value PV_i.

The monitor device may be configured to determine one or more of a primary parameter PP_i, a primary value PV_i, a primary counter PC_i, a secondary parameter SP_i, a secondary value SV_i, a secondary counter SC_i, and a tertiary counter TC_i, e.g., before or after determining a sensor state SS_i. For example, the monitor device may be configured to determine/update one or more parameters, values, and/or counters, and wherein to determine sensor state(s) is based on the one or more parameters, values, and/or counters. For example, to determine a sensor state may be based on one or more of a primary parameter, a primary value, a primary counter, a secondary parameter, a secondary value, a secondary counter, and a tertiary counter. In one or more exemplary monitor devices, determining a primary value and/or a primary counter may be based on a secondary state machine.

A primary parameter PP_i and/or a secondary parameter SP_i for the i'th sensor S_i for determination of the i'th sensor state SS_i of the i'th sensor may be based on a voltage of the i'th sensor, i.e., the i'th sensor data may comprise voltage data (i'th primary sensor data) of the i'th sensor.

A primary parameter PP_i for the i'th sensor S_i and/or a secondary parameter SP_i for determination of the i'th sensor state SS_i of the i'th sensor may be based on a capacitance and/or resistance of the i'th sensor. Accordingly, the i'th sensor data may comprise capacitance data (i'th secondary sensor data) and/or resistance data (i'th primary sensor data or i'th tertiary sensor data) of the i'th sensor.

The primary parameter PP_1 for determination of the first sensor state of the first sensor may be based on a first voltage of the first sensor, i.e., the first sensor data may comprise voltage data of the first sensor.

The primary parameter may be indicative of a decay, such as a relative decay, e.g., relative to a set limit also denoted PP_LL, of a voltage or resistance of the first sensor. The primary parameter for the first sensor may be denoted PP_1 and be given as:

$$PP\_1 = \frac{V\_1_{-1} - V\_1}{V\_1_{-1} - PP\_LL},$$

where V_1 is the currently measured signal, such as the currently measured voltage or resistance (or indicative thereof), over the first sensor, $V\_1_{-1}$ is the previously (last cycle) measured voltage or resistance (or indicative thereof) over the first sensor, and PP_LL is a default set lower limit for the primary parameter.

Generally, the primary parameter for the i'th sensor may be denoted PP_i and be given as:

$$PP\_i = V\_i_{-1} - V\_i,$$

where V_i is the currently measured signal (primary sensor data), such as the currently measured voltage or resistance (or indicative thereof), over the i'th sensor, and $V\_i_{-1}$ is the previously (last cycle) measured signal (primary sensor data), such as the previously measured voltage or resistance (or indicative thereof) over the i'th sensor.

The primary parameter may be given by:

$$PP\_1 = \frac{V\_1_{-1} - V\_1}{1/f},$$

where V_i is the currently measured signal (primary sensor data), such as the currently measured voltage or resistance (or indicative thereof), over the i'th sensor, $V\_i_{-1}$ is the previously (last cycle) measured signal (primary sensor data), such as the previously measured voltage or resistance (or indicative thereof) over the i'th sensor and 1/f is the time between consecutive samples or measurements.

The primary parameter may be given by:

$$PP\_i = \frac{V\_i_{-1} - V\_i}{V\_i_{-1} - PP\_LL},$$

where V_i is the currently measured signal (primary sensor data), such as the currently measured voltage or resistance (or indicative thereof), over the i'th sensor, $V\_i_{-1}$ is the previously (last cycle) measured signal (primary sensor data), such as the previously measured voltage or resistance (or indicative thereof) over the i'th sensor, and PP_LL is a default set lower limit for the primary parameter.

The monitor device may be configured to determine one or more of a secondary parameter, a secondary value, a secondary counter, and a tertiary counter, e.g., before, during, or after determining a sensor state. The secondary parameter may be indicative of a noisy sensor measurement.

The secondary parameter may be based on the primary parameter and/or one or more noise criteria. For example, the secondary parameter SP_i may be set to a value indicative of high noise if a first noise criterion NCR_1_i and/or a second noise criterion NCR_2_i are satisfied.

The first noise criterion NCR_1_i for the i'th sensor may be given by:

$$NCR\_1\_i: PP\_i < N\_VALUE\_1,$$

where N_VALUE_1 is a noise threshold. In other words, the secondary parameter may be set to indicate a noisy measurement if the primary parameter is indicative of noise or spike in the sensor data, such as voltage, by an increase in the voltage. In other words, determining the secondary parameter may comprise setting SP_i to a value indicative of noise present if the first noise criterion is satisfied.

The secondary parameter may be based on a capacitance and/or a voltage of the sensor data. The secondary parameter may be based on a tertiary parameter. The tertiary parameter may be indicative of a change in voltage. For example, the tertiary parameter TP_i for the i'th sensor may be given as:

$$TP\_i = V\_i_{-1} - V\_i,$$

where V_i is the currently measured signal, such as the currently measured voltage or resistance (or indicative thereof), over the i'th sensor and $V\_1_{-1}$ is the previously (last cycle) measured voltage or resistance (or indicative thereof) over the i'th sensor.

The second noise criterion may be based on one or more of a capacitance of the sensor data, a voltage of the sensor data, and the primary parameter. The second noise criterion NCR_2_i for the i'th sensor may be given by:

$$NCR\_2\_i: C\_i_{-1} < N\_VALUE\_2 \text{ AND } V\_i_{-1} > N\_VALUE\_3 \text{ AND } PP\_i >= N\_VALUE\_4,$$

where $C\_i_{-1}$ is the previously (last cycle) measured capacitance (or indicative thereof) over the i'th sensor, $V\_1_{-1}$ is the previously (last cycle) measured voltage or resistance (or indicative thereof) over the i'th sensor, PP_i is the current primary parameter, and N_VALUE_2, N_VALUE_3, and N_VALUE_4 are noise thresholds. In other words, determining the secondary parameter may comprise setting SP_i to a value indicative of noise present if the second noise criterion is satisfied.

In one or more exemplary monitor devices, the secondary parameter SP_i may be set to a value, e.g., 1, indicative of medium or low noise, if a third noise criterion NCR_3_i is satisfied. The third noise criterion may be based on one or more of a capacitance of the sensor data, a voltage of the sensor data, the primary parameter, and the tertiary parameter.

The third noise criterion NCR_3_i for the i'th sensor may be given by:

$$NCR\_3\_i: TP\_i < N\_VALUE\_5,$$

where TP_i is the current tertiary parameter and N_VALUE_5 is a noise threshold. In other words, determining the secondary parameter may comprise setting SP_i=1 if the third noise criterion is satisfied. If none of the noise criteria NCR_1, NCR_2 and NCR_3 are satisfied, the secondary parameter may be set to 0 to indicate that no noise is detected in the sensor measurement. In other words, determining the secondary parameter may comprise setting SP_i=0 if no noise criterion is satisfied.

The monitor device is optionally configured to determine a secondary value based on the secondary parameter. The secondary value may also be denoted a secondary vector. The secondary vector may be denoted a noise history vector indicative of historic noise in sensor measurements. For example, the secondary value SV_i may comprise N previously determined secondary parameters, where N optionally is in the range from 5 to 40. To determine a secondary value based on the secondary parameter may comprise deleting the oldest secondary parameter and inserting the currently determined secondary parameter into the secondary value.

The monitor device is optionally configured to determine a secondary counter based on the secondary value. For example, the secondary counter may be the sum of one or more secondary parameters, such as all of the secondary parameters, of the secondary value/vector.

The monitor device is optionally configured to determine a tertiary counter based on the secondary value and/or one or more no-noise criteria NNC_i. For example, the tertiary counter may be incremented in accordance with a determination that a no-noise criterion is satisfied. For example, the no-noise criterion may be based on the secondary value and/or the secondary parameter. For example, the no-noise criterion may be satisfied if the secondary counter is less than a noise threshold. For example, the tertiary counter may be reset in accordance with a determination that a noise criterion is satisfied or in accordance with a determination that a noise criterion is satisfied.

In one or more exemplary monitor devices/methods of operating a monitor device, determining if a first criterion, e.g., for the first sensor also denoted CR_1_1, is satisfied comprises updating a primary counter (for the first sensor), e.g., in accordance with or based on the primary parameter and/or the primary value (for the first sensor); and wherein the first criterion is based on the primary counter. For example, the first criterion CR_1_1 may be satisfied if the primary value, also denoted PV_1 for the first sensor, satisfies a first sub-criterion, e.g., if PV_1=VALUE_1_1 and/or the primary counter, also denoted PC_1 for the first sensor, satisfies a second sub-criterion, e.g., if PC_1=VALUE_2. In other words, the first criterion may be based on the primary value and/or the primary counter.

The first criterion, CR_1_1 for the first sensor, may be given by:

$$CR\_1\_1: PV\_1 = VALUE\_1\_1 \text{ AND } PC\_1 = VALUE\_2,$$

where VALUE_1_1 is a flag with the value "1" and VALUE_2 is a counter threshold, e.g., in the range from 10 to 25.

The first criterion, e.g., CR_1_1 for the first sensor, may have an associated priority indicative of an order of assessment in relation to other criteria being evaluated in the same state of the sensor state machine. The first criterion, e.g., CR_1_1 for the first sensor, may have priority "2", i.e., evaluated after criterion with priority "1" but before criteria with priority "3" and "4".

Thus, in one or more exemplary monitor devices, the monitor device is configured to, for the first sensor, determine a primary parameter based on the first sensor data; updating a primary value based on the primary parameter and optionally updating a primary counter in accordance with the primary value. One or more criteria, such as the first criterion and/or the second criterion, may be based on the primary value and/or the primary counter.

In one or more exemplary monitor devices/methods of operating a monitor device, to determine a first sensor state comprises, e.g., when the first sensor is in a default state, determining if a second criterion, also denoted CR_2_1, is satisfied; and in accordance with the second criterion being satisfied, setting the first sensor state to a second state. The second state may be an attention state, e.g., indicative of the first sensor detecting that attention must be paid to the first sensor state and/or indicative of increased risk of a leak or presence of output or body fluid at the first sensor.

The second criterion may be based on one or more of the primary parameter, the primary value and the primary counter.

For example, the second criterion CR_2_1 may be satisfied if the primary value, also denoted PV_1 for the first sensor, satisfies a first sub-criterion, e.g., if PV_1=VALUE_1_2 and the primary counter, also denoted PC_1 for the first sensor, satisfies a second sub-criterion, e.g., if PC_1=VALUE_2. In other words, the second criterion may be based on the primary value and the primary counter.

The second criterion, CR_2_1 for the first sensor, may be given by:

$$CR\_2\_1: PV\_1 = VALUE\_1\_2 \text{ AND } PC\_1 = VALUE\_2.$$

The second criterion, e.g., CR_2_1 for the first sensor, may have an associated priority indicative of an order of assessment in relation to other criteria being evaluated in the same state of the sensor state machine. The second criterion, e.g., CR_2_1 for the first sensor, may have priority "3", i.e., evaluated after criterion with priority "1" and "2" and before criterion with priority "4".

In one or more exemplary monitor devices/methods of operating a monitor device, to determine a first sensor state comprises, e.g., when the first sensor is in the default state, determining if a third criterion is satisfied, and in accordance with the third criterion being satisfied, setting the first sensor state to a third state.

The third criterion, CR_3_1 for the first sensor, may be given by:

$$CR\_3\_1: V\_1 < TH\_3,$$

where V_1 is the currently measured signal, such as the currently measured voltage or resistance (or indicative thereof), over the first sensor.

Thus, in one or more exemplary monitor devices/methods of operating a monitor device, the third criterion CR_3_1 for the first sensor is based on first primary sensor data indicative of a voltage of the first sensor data. In other words, sensor data may comprise primary sensor data indicative of a voltage measured over the sensor, for example, first sensor data may comprise first primary sensor data indicative of a voltage measured over the first sensor.

The third criterion, e.g., CR_3_1, may have an associated priority indicative of an order of assessment in relation to other criteria being evaluated in the same state of the sensor state machine. The third criterion may have priority "4", i.e., evaluated after criteria with priority "1", "2", and "3".

In one or more exemplary monitor devices/methods of operating a monitor device, to determine a first sensor state comprises, e.g., when the first sensor is in the default state and/or in the third state, determining if a fourth criterion is satisfied, and in accordance with the fourth criterion being satisfied, setting the first sensor state to a fourth state. The fourth state may be a noise state, e.g., indicative of noise in the sensor data.

In one or more exemplary monitor devices/methods of operating a monitor device, determining if a fourth criterion is satisfied comprises determining a secondary parameter based on the first sensor data; updating a secondary counter in accordance with the secondary parameter and/or the primary parameter; and wherein the fourth criterion is based on the secondary counter. The secondary counter may be a noise counter, e.g., incremented when the sensor data are noisy. The secondary counter may be a noise counter, e.g., based on the secondary parameter and/or the secondary value. The secondary counter may be a sum or at least based on elements of the secondary value being a vector.

The fourth criterion, CR_4_1 for the first sensor, may be given by:

$$CR\_4\_1: SC\_1 > TH\_4,$$

where SC_1 is a secondary counter and TH_4 is a threshold value. Thus, the fourth state may be a noise state indicative of the sensor data being noisy. The secondary counter ensures that few false detections of noise do not qualify as noise, in turn improving the detection of noise and securing correct state change detection.

The fourth criterion, e.g., CR_4_1, may have an associated priority indicative of an order of assessment in relation to other criteria being evaluated in the same state of the sensor state machine. The fourth criterion may have priority "1", i.e., evaluated before criteria with priority "2", "3", and "4".

In one or more exemplary monitor devices/methods of operating a monitor device, to determine a first sensor state optionally comprises, e.g., when the first sensor is in a default stated, in accordance with none of the first criterion CR_1_1, the second criterion CR_2_1, the third criterion CR_3_1, and CR_4_1, setting the first sensor state to the default state. In other words, the default state may be maintained if none of the criteria CR_1_1, CR_2_1, CR_3_1, and CR_4_1 are satisfied. In one or more exemplary monitor devices/methods of operating a monitor device, to determine a first sensor state optionally comprise, e.g., when the first sensor is in a default stated, to determine if a default criterion is satisfied, and in accordance with the default criterion being satisfied, setting the first sensor state to the default state.

In one or more exemplary monitor devices, the monitor device, when the first sensor state is the second state, is configured to determine if the first criterion is satisfied; and in accordance with the first criterion being satisfied, setting the first sensor state to the first state.

In one or more exemplary monitor devices, the monitor device, when the first sensor state is the third state, is configured to determine if the first criterion is satisfied, and in accordance with the first criterion being satisfied, setting the first sensor state to the first state.

In one or more exemplary monitor devices, the monitor device, when the first sensor state is the third state, is configured to determine if the second criterion is satisfied, and in accordance with the second criterion being satisfied, setting the first sensor state to the second state.

In one or more exemplary monitor devices, the monitor device, when the first sensor state is the third state, is configured to determine if the fourth criterion is satisfied, and in accordance with the fourth criterion being satisfied, setting the first sensor state to the fourth state.

In one or more exemplary monitor devices, the monitor device, when the first sensor state is the third state, is configured to determine if a fifth primary criterion CR_5_1_1 for the first sensor is satisfied, and in accordance with the fifth primary criterion being satisfied, setting the first sensor state to a fifth state. The fifth state may be a blinded state or a malfunction state, where the sensor is blinded or not able to function correctly.

The fifth primary criterion, CR_5_1_1, for the first sensor may be given by:

$$CR\_5\_1\_1: V\_1 < TH\_5 \text{ AND } PV\_1 = VALUE\_1\_3,$$

where TH_5 is a threshold and VALUE_1_3 is a value.

In one or more exemplary monitor devices, the monitor device, e.g., when the first sensor state is the fourth state, is configured to determine if a third secondary criterion CR_3_2_1 for the first sensor is satisfied, and in accordance with the third secondary criterion being satisfied, setting the first sensor state to the third state.

In one or more exemplary monitor devices, the monitor device, e.g., when the first sensor state is the fourth state, is configured to determine if a fifth secondary criterion CR_5_2_1 is satisfied, and in accordance with the fifth secondary criterion being satisfied, setting the first sensor state to the fifth state.

In one or more exemplary monitor devices/methods of operating a monitor device, to determine a second sensor state comprises setting the second sensor state to a default state; determining if a first criterion, also denoted CR_1_2, is satisfied, and in accordance with the first criterion being satisfied, setting the second sensor state to a first state.

In one or more exemplary monitor devices/methods of operating a monitor device, to determine a second sensor state comprises determining if a second criterion is satisfied, and in accordance with the second criterion being satisfied, setting the second sensor state to a second state.

It is to be understood that the description of determining a first sensor state for a first sensor of the personal care appliance also applies to determining a second sensor state for a second sensor of the personal care appliance, to determining a third sensor state for a third sensor of the personal care appliance, to determining a fourth sensor state for a fourth sensor of the personal care appliance, and optionally to determining a fifth sensor state for a fifth sensor of the personal care appliance and/or a sixth sensor state for a sixth sensor of the personal care appliance.

In one or more exemplary monitor devices/methods of operating a monitor device, to output a first sensor state identifier indicative of the first sensor state and a second sensor state identifier indicative of the second sensor state comprises transmitting the first sensor state identifier and/or the second sensor state identifier to the accessory device. The first sensor state identifier and the second sensor state identifier may be transmitted in a personal care appliance status vector.

Also disclosed is a personal care appliance status vector, also denoted personal care appliance status package, comprising a plurality of sensor state identifiers for respective sensors of the personal care appliance. The plurality of sensors includes a first sensor state identifier and a second sensor state identifier, wherein the first sensor state identifier is indicative of a first sensor state of a first sensor and the second sensor state identifier is indicative of a second sensor state of a second sensor.

A sensor state identifier, such as the first sensor state identifier and/or the second sensor state identifier, may have a size of 16 bits or less, such as 4 or 8 bits. A sensor state identifier may be an unsigned integer, such as Uint8.

The personal care appliance status vector may comprise a third sensor state identifier and/or a fourth second sensor state identifier, wherein the third sensor state identifier is indicative of a third sensor state of a third sensor and the fourth sensor state identifier is indicative of a fourth sensor state of a fourth sensor.

The personal care appliance status vector may comprise from three to ten sensor state identifiers.

It is to be noted that descriptions of the monitor device being configured to perform acts also apply to the corresponding acts in the method of operating a monitor device and vice versa.

Also disclosed is a computer readable storage medium storing one or more programs, the one or more programs comprising instructions, which when executed by a monitor device with a first interface, a second interface, a memory and a processor cause the monitor device to perform any of the methods of operating a monitor device as described herein.

FIG. 1 illustrates an exemplary personal care system 1 embodied as an ostomy system 1A. The personal care system 1 (ostomy system 1A) comprises a personal care appliance 2 embodied as an ostomy appliance 2A including a base plate 4 and an ostomy pouch (not shown). Further, the personal care system 1 comprises a monitor device 6 and an accessory device 8 (mobile telephone, smartphone). The monitor device 6 is connectable to the personal care appliance 2, such as to base plate 4 and/or to an electrode assembly of or mounted to the personal care appliance, via respective first connectors of the monitor device 6 and base plate 4/electrode assembly. The monitor device 6 is configured for wireless communication via connection 9 with the accessory device 8. Optionally, the accessory device 8 is configured to communicate with a server device 10 of the personal care system 1, e.g., via network 12. The server device 10 may be operated and/or controlled by the ostomy appliance manufacturer and/or a service centre. Appliance or sensor data (ostomy data in the shown ostomy system) or parameter data based on the appliance or sensor data (ostomy data in the shown ostomy system) are obtained from electrodes/sensors of electrode assembly embedded in or mounted to the personal care appliance 2 with the monitor device 6. The monitor device 6 processes the appliance or sensor data and/or parameter data based on the appliance or sensor data to determine monitor data that are transmitted to the accessory device 8 via connection 9. The monitor data comprises a personal care appliance status vector/sensor state identifiers as disclosed herein.

In the illustrated personal care system, the accessory device 8 is a mobile phone, however the accessory device 8 may be embodied as another handheld device, such as a tablet device, or a wearable, such as a watch or other wrist-worn electronic device. Accordingly, the monitor device 6 is configured to determine monitor data and transmit the monitor data to the accessory device 8. The base plate 4 comprises a coupling member 14 in the form of a coupling ring 16 for coupling an ostomy pouch (not shown) to the base plate (two-part ostomy appliance). The base plate 4 has a stomal opening 18 with a center point 19. The size and/or shape of the stomal opening 18 is typically adjusted by the user or nurse before application of the ostomy appliance to accommodate the user's stoma.

The personal care system 1 optionally comprises a docking station 20 forming an accessory device of the personal care system 1. The docking station 20 comprises a docking monitor interface including a first connector 22 configured for electrically and/or mechanically connecting the monitor device 6 to the docking station 20. The docking monitor interface may be configured for wirelessly connecting the monitor device 6 to the docking station 20. The docking station 20 comprises a user interface 24 for receiving user input and/or providing feedback to the user on the operational state of the docking station 20. The user interface 24 may comprise a touch-screen. The user interface 24 may comprise one or more physical buttons and/or one or more visual indicators, such as light emitting diodes.

Figure 2:
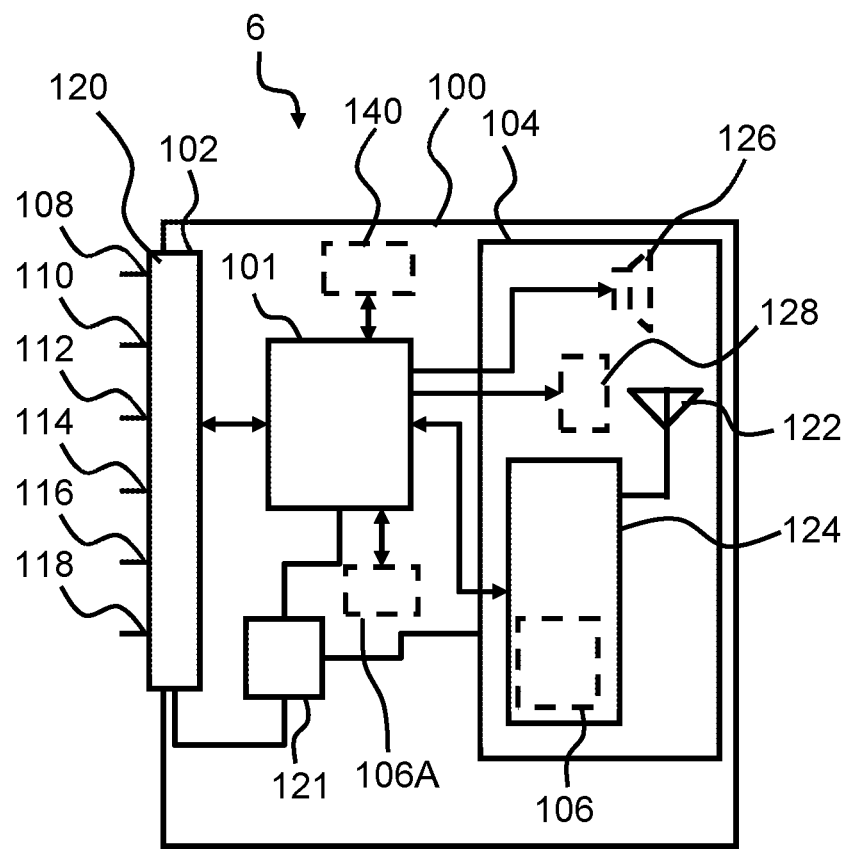
FIG. 2 illustrates an exemplary monitor device according to the present disclosure.

FIG. 2 is a schematic block diagram of an exemplary monitor device. The monitor device 6 comprises a monitor device housing 100, a processor 101, and one or more interfaces, the one or more interfaces including a first interface 102 (appliance interface) and a second interface 104 (accessory interface), the first interface 102 configured for connecting the monitor device 6 to the personal care appliance, and the second interface 104 comprising a transceiver module connected to the processor 101 and configured for connecting the monitor device 6 to an accessory device of the personal care system. The monitor device 6 comprises a memory 106/106A optionally for storing monitor data based on appliance or sensor data and/or parameter data based on the monitor data. The memory 106/106A is optionally connected to the processor 101. The memory 106 or at least a part thereof may be embedded as flash memory in the second interface 104.

The first interface 102 is configured as an appliance interface for electrically and/or mechanically connecting the monitor device 6 to the personal care appliance, e.g., ostomy appliance 2A or a wound dressing appliance. The first interface 102 comprises a plurality of terminals for forming electrical connections with respective terminals/sensors of the personal care appliance 2 (electrode assembly). The first interface 102 optionally comprises between four and 20 terminals, such as between six and twelve terminals, including a ground terminal 108, a first terminal 110, a second terminal 112 and a third terminal 114. The first interface 102 optionally comprises a fourth terminal 116 and a fifth terminal 118. In one or more exemplary monitor devices, the first interface 102 optionally comprises a sixth terminal and/or a seventh terminal. The first interface 102 of the monitor device 6 comprises a coupling part 120 for forming a mechanical connection, such as a releasable coupling between the monitor device and the personal care appliance, e.g., with a base plate of an ostomy appliance and/or an electrode assembly of ostomy system/wound dressing system. The coupling part 120 and the terminals 108, 110, 112, 114, 116, and 118 of the first interface 102 form (at least part of) a first connector of the monitor device 6.

The monitor device 6 comprises a power unit 121 for powering the monitor device and active components thereof, i.e., the power unit 121 is connected to the processor 101, the first interface 102, and the second interface 104. The power unit comprises a battery and charging circuitry. The charging circuitry is connected to the battery and optionally to terminals of the first interface 102 for charging the battery via terminals of the first interface, e.g., terminals of the first connector. The charging circuitry may be configured for wireless charging of the battery.

The second interface 104 of monitor device is configured as an accessory interface for connecting the monitor device 6 to one or more accessory devices such as accessory device 8. The second interface 104 comprises an antenna 122 and a wireless transceiver 124 also denoted transceiver module, the wireless transceiver 124 connected to the processor 101 and configured for wireless communication with accessory device(s), such as configured for connecting the monitor device to the one or more accessory devices of the personal care system. Optionally, the second interface 104 comprises a loudspeaker 126 and/or a haptic feedback element 128 for provision of respective audio signal and/or haptic feedback to the user. The memory 106 may be an internal memory, such as flash memory of the wireless transceiver 124. Thereby, a separate memory module can be omitted which provides a simpler and lighter/smaller monitor device.

The monitor device 6 optionally comprises a sensor unit 140 connected to the processor 101. The sensor unit 140 may comprise a temperature sensor for feeding temperature data to the processor 101 and/or a G-sensor or accelerometer for feeding acceleration data to the processor 101.

The monitor device/processor 101/transceiver module 124 is optionally configured to establish a connection between the monitor device and at least one of the one or more accessory devices, such as connection 9 to accessory device 8.

The monitor device 6 is configured to obtain sensor data from respective sensors, such as electrode pairs of personal care appliance, via terminals of 108, 110, 112, 114, 116, and 118 of the first interface 102, the sensor data including first sensor data SD_1 from a first sensor S_1 (e.g., first electrode pair) of the personal care appliance, second sensor data SD_2 from a second sensor S_2 (e.g., second electrode pair) of the personal care appliance, and determine sensor state(s) of respective sensor(s) of the personal care appliance based on the sensor data, i.e., to determine a first sensor state SS_1 of the first sensor S_1 based on the first sensor data SD_1 and/or determine a second sensor state SS_2 of the second sensor S_2 based on the second sensor data SD_2.

The monitor device is optionally configured to output a first sensor state identifier SSI_1 indicative of the first sensor state SS_1 and/or a second sensor state identifier SSI_2 indicative of the second sensor state SS_2, e.g., included in a personal care appliance status vector. In other words, the monitor device is optionally configured to output one or more sensor state identifiers SSI_1, SSI_2, . . . SSI_M indicative of sensor state(s) SS_1, SS_2, . . . SS_M of respective M sensor(s) S_1, S_2, . . . , S_M of the personal care appliance, by including sensor state identifiers SSI_1, SSI_2, . . . SSI_M in a personal care appliance status vector or package and outputting the personal care appliance status vector, e.g., by transmitting the personal care appliance status vector to accessory device via second interface.

The monitor device 6 is configured to determine one or more sensor states of respective one or more sensors of the personal care appliance, e.g., of respective one or more sensors embedded in or attached to a base plate of an ostomy appliance and/or of respective one or more sensors embedded in a wound dressing. The monitor device 6 may be configured to determine sensor state(s) by respective sensor state machine(s) applied to the respective sensor data. The monitor device may be configured to determine sensor states at a sensor state frequency, e.g., in the range from 0.01 Hz to 1 Hz. In one or more monitor devices, the sensor state frequency may be from 0.05 Hz to 0.2 Hz, such as 0.1 Hz, e.g., in the range from 0.01 Hz to 1 Hz. In other words, the monitor device may be configured to determine sensor state(s) SS_1, SS_2, . . . SS_M every 5 to 20 seconds, such as every 10 seconds.

The monitor device 6 is configured to output, such as wirelessly transmit via the second interface, one or more sensor state identifiers SSI_1, SSI_2, . . . SSI_M, e.g., a first sensor state identifier indicative of the first sensor state and/or a second sensor state identifier indicative of the second sensor state. To output one or more sensor state identifiers may comprise to include the one or more sensor state identifiers in a personal care appliance status vector and transmit, such as wirelessly transmit, the personal care appliance status vector via the second interface 104 of the monitor device 6.

In monitor device 6, to determine a first sensor state SS_1 based on the first sensor data SD_1 comprises selecting the first sensor state from at least three sensor states or more than three sensor states, such as four, five, six, seven, eight, or more sensor states. In other words, the first sensor state SS_1 may be selected from a set of sensor states comprising in the range from three to ten sensor states, such as from four, five, six, seven, eight, nine, or ten sensor states.

In monitor device 6, to determine a second sensor state based on the second sensor data comprises selecting the second sensor state from at least three sensor states or more than three sensor states such as four, five, six, seven, eight, or more sensor states. The second sensor state may be selected from a set of sensor states comprising in the range from three to ten sensor states, such as from four, five, six, seven, eight, nine, or ten sensor states.

The monitor device 6 is optionally configured to obtain third sensor data SD_3 from a third sensor S_3 of the personal care appliance and determine a third sensor state SS_3 of the third sensor S_3 based on the third sensor data SD_3. The monitor device 6 is optionally configured to wirelessly transmit via the second interface 104 a third sensor state identifier SSI_3 indicative of the third sensor state SS_3.

In monitor device 6, to determine a first sensor state SS_1 optionally comprises setting the first sensor state to a default state at least in a first determination of the first sensor state; determining if a first criterion CR_1_1 is satisfied; and in accordance with the first criterion CR_1_1 being satisfied, setting the first sensor state SS_1 to a first state "1". The first state may be denoted a leak state, alarm state, or high-risk state, i.e., a state where the sensors of the personal care appliance have detected a leak or presence of output or body fluid.

The monitor device 6 may be configured to determine a primary parameter PP_1 based on the first sensor data SD_1 and updating a primary value PV_1 and/or a primary counter PC_1 based on the primary parameter, e.g., prior to or as part of determining if CR_1_1 and optionally further criteria CR_2_1, CR_3_1 are satisfied. The first criterion CR_1_1 may be based on one or more of PV_1, PP_1, and PC_1. The primary value PV_1 may be a flag, e.g., set according to a secondary state machine used for updating/determining the primary value. In other words, determining if a first criterion CR_1_1 is satisfied optionally comprises determining a primary parameter PP_1 based on the first sensor data; optionally updating a primary value PV_1 and/or a primary counter PC_1 based on the primary parameter; and wherein the first criterion is based on one or more of the primary value PV_1, the primary parameter PP_1 an. The primary value may be a flag, e.g., set according to a secondary state machine used for updating/determining the primary value.

The monitor device 6 may be configured to determine a secondary parameter SP_1 based on the first sensor data SD_1 and/or the first primary parameter PP_1, and optionally updating a secondary value SV_1 and/or a secondary counter SC_1, e.g., based on the first sensor data, the secondary parameter and/or the primary parameter, e.g., prior to or as part of determining if fourth criterion CR_4_1 and optionally further criteria, such as CR_1_1, CR_2_1, CR_3_1 are satisfied. The fourth criterion CR_4_1 may be based on one or more of SV_1, SP_1, and SC_1.

In monitor device 6, the primary parameter, e.g., PP_1 (for determination of the first sensor state), may be based on a first voltage of the first sensor, i.e., the first sensor data may comprise voltage data of the first sensor. The primary parameter is indicative of a decay, such as a relative decay, e.g., relative to a set limit also denoted PP_LL, of a voltage or resistance of the first sensor. The primary parameter for the first sensor may be denoted PP_1 and be given as:

$$PP\_1 = \frac{V\_1_{-1} - V\_1}{V\_1_{-1} - PP\_LL},$$

where V_1 is the currently measured signal, such as the currently measured voltage or resistance (or indicative thereof), over the first sensor, $V\_1_{-1}$ is the previously (last cycle) measured voltage or resistance (or indicative thereof) over the first sensor, and PP_LL is a default set lower limit for the primary parameter.

In monitor device 6, the first criterion CR_1_1 for the first sensor S_1 is based on the primary counter PC_1. For example, the first criterion CR_1_1 may be satisfied if the primary value PV_1 for the first sensor satisfies a first sub-criterion: PV_1=VALUE_1_1 and the primary counter PC_1 for the first sensor satisfies a second sub-criterion: PC_1=VALUE_2. Thus, the first criterion, CR_1_1 for the first sensor may be given by:

CR_1_1:PV_1=VALUE_1_1 AND PC_1=VALUE_2, where VALUE_1_1 optionally being 1 and VALUE_2 optionally being 18 are predefined values. The primary counter PC_1 introduces a waiting period to ensure that state change does not occur due to noise. Thus, false state changes to the first state are reduced.

The first criterion, e.g., CR_1_1 for the first sensor, may have an associated priority indicative of an order of assessment in relation to other criteria being evaluated in the same state of the sensor state machine. The first criterion, e.g. CR_1_1 for the first sensor, may have priority "2", i.e. evaluated after criterion with priority "1" but before criterion with priority "3".

Thus, in one or more exemplary monitor devices, the monitor device is configured to, for the first sensor, determine a primary parameter based on the first sensor data; updating a primary value based on the primary parameter and optionally updating a primary counter in accordance with the primary value. One or more criteria, such as the first criterion and/or the second criterion, may be based on the primary value and/or the primary counter. Updating the primary value and/or the primary counter may be based on a secondary state machine.

In monitor device 6, to determine a first sensor state comprises, e.g., when the first sensor is in a default state, determining if a second criterion, also denoted CR_2_1, is satisfied; and in accordance with the second criterion being satisfied, setting the first sensor state to a second state. The second state may be an attention state, e.g., indicative of the first sensor detecting that attention must be paid to the first sensor state and/or indicative of increased risk of a leak or presence of output or body fluid at the first sensor.

The second criterion may be based on one or more of the primary parameter, the primary value and the primary counter. For example, the second criterion CR_2_1 may be satisfied if the primary value PV_1 for the first sensor satisfies a first sub-criterion: PV_1=VALUE_1_2 and the primary counter PC_1 for the first sensor satisfies a second sub-criterion: PC_1=VALUE_2. In other words, the second criterion may be based on the primary value and the primary counter. The second criterion, CR_2_1 for the first sensor, may be given by:

CR_2_1:PV_1=VALUE_1_2 AND PC_1=VALUE_2, where VALUE_1_2 optionally being 2 and VALUE_2 optionally being 18 are predefined values. The primary counter PC_1 introduces a waiting period to ensure that state change does not occur due to noise. Thus, false state changes to the second state are reduced.

The second criterion, e.g., CR_2_1 for the first sensor, may have an associated priority indicative of an order of assessment in relation to other criteria being evaluated in the same state of the sensor state machine. The second criterion, e.g., CR_2_1 for the first sensor, may have priority "3", i.e., evaluated after criterion with priority "1" and "2".

In monitor device 6, to determine a first sensor state comprises, e.g., when the first sensor is in the default state, determining if a third criterion is satisfied, and in accordance with the third criterion being satisfied, setting the first sensor state to a third state. The third state may be an intermediate state of the sensor, where the sensor data are indicative of some moisture, but the cause of the change in sensor data cannot be clearly derived. For example, the third state may indicate that a user of an ostomy appliance sweats and that the first sensor detects presence of sweat but not output.

The third criterion, CR_3_1 for the first sensor, may be given by:

CR_3_1: $V\_1$<TH_3, where V_1 is the currently measured signal (first sensor data), such as the currently measured voltage or resistance (or indicative thereof), over the first sensor. Thus, the third criterion CR_3_1 for the first sensor is based on first primary sensor data indicative of a voltage of the first sensor data. In other words, sensor data may comprise primary sensor data indicative of a voltage measured over the sensor, for example, first sensor data may comprise first primary sensor data indicative of a voltage measured over the first sensor.

The third criterion, e.g., CR_3_1, may have an associated priority indicative of an order of assessment in relation to other criteria being evaluated in the same state of the sensor state machine. The third criterion may have priority "4", i.e., evaluated after criteria with priority "1", "2", and "3".

In monitor device 6, to determine a first sensor state comprises, e.g., when the first sensor is in the default state and/or in the third state, determining if a fourth criterion CR_4_1 is satisfied, and in accordance with the fourth criterion CR_4_1 being satisfied, setting the first sensor state SS_1 to a fourth state.

In monitor device 6, determining if a fourth criterion is satisfied optionally comprises determining a secondary parameter SP_1 based on the first sensor data; updating a secondary counter SC_1 in accordance with the secondary parameter SP_1; and wherein the fourth criterion is based on the secondary counter SC_1. The secondary counter may be a noise counter, e.g., indicative of noise in the sensor data. The fourth criterion, CR_4_1 for the first sensor, may be given by:

$$CR\_4\_1: SC\_1 > TH\_4,$$

where SC_1 is a secondary counter and TH_4 is a threshold value.

The fourth criterion, e.g., CR_4_1, may have an associated priority indicative of an order of assessment in relation to other criteria being evaluated in the same state of the sensor state machine. The fourth criterion may have priority "1", i.e., evaluated before criterion with priority "2" and criterion with priority "3".

The monitor device 6, when the first sensor state SS_1 is the second state, is configured to determine if the first criterion CR_1_1 is satisfied; and in accordance with the first criterion being satisfied, setting the first sensor state to the first state. In other words, the first sensor state may change from the second state to the first state if the first criterion or a first secondary criterion, is satisfied.

The monitor device 6, when the first sensor state SS_1 is the third state, is optionally configured to determine if the first criterion CR_1_1 is satisfied, and in accordance with the first criterion being satisfied, setting the first sensor state to the first state. In other words, the first sensor state may change from the third state to the first state if the first criterion or a first secondary criterion, is satisfied.

The monitor device 6, when the first sensor state SS_1 is the third state, is optionally configured to determine if the second criterion CR_2_1 is satisfied, and in accordance with the second criterion being satisfied, setting the first sensor state to the second state. In other words, the first sensor state may change from the third state to the second state if the second criterion or a second secondary criterion, is satisfied.

The monitor device 6, when the first sensor state SS_1 is the third state, is optionally configured to determine if the fourth criterion is satisfied, and in accordance with the fourth criterion being satisfied, setting the first sensor state to the fourth state. In other words, the first sensor state may change from the third state to the fourth state if the fourth criterion or a fourth secondary criterion, is satisfied.

The monitor device 6, when the first sensor state SS_1 is the third state, is optionally configured to determine if a fifth primary criterion CR_5_1_1 for the first sensor is satisfied, and in accordance with the fifth primary criterion being satisfied, setting the first sensor state to a fifth state being a blinded state for the first sensor. The fifth primary criterion, CR_5_1_1 for the first sensor may be given by:

$$CR\_5\_1\_1: V\_1 < TH\_5 \text{ AND } PV\_1 = VALUE\_1\_3,$$

where TH_5 is a threshold and VALUE_1_3 is a value.

The monitor device 6, e.g., when the first sensor state is the fourth state, is optionally configured to determine if a default criterion CR_D_1 for the first sensor is satisfied, and in accordance with the default criterion being satisfied, setting the first sensor state to the default state. The default criterion CR_D_1 may be based on a tertiary counter TC_1 and the first sensor data, e.g., V_1. The default criterion, CR_D_1 for the first sensor may be given by:

$$CR\_D\_1: V\_1 > TH\_6 \text{ AND } TC\_1 >= TH\_7,$$

where TH_6 and TH_7 are thresholds. The tertiary counter may be indicative of the number of consecutive sensor data samples with no noise. Thus, moving from the fourth state also denoted the noise state and back to the default state may require a number, e.g., 40, of data samples with no noise.

The monitor device 6, e.g., when the first sensor state is the fourth state, is optionally configured to determine if a third secondary criterion CR_3_2_1 for the first sensor is satisfied, and in accordance with the third secondary criterion being satisfied, setting the first sensor state to the third state. The third secondary criterion CR_3_2_1 may be based on a tertiary counter TC_1 and the first sensor data, e.g., V_1.

The third secondary criterion, CR_3_2_1 for the first sensor may be given by:

$$CR\_3\_2\_1: V\_1 < TH\_6 \text{ AND } TC\_1 >= TH\_7,$$

where TH_6 and TH_7 are thresholds. The tertiary counter may be indicative of the number of consecutive sensor data samples with no noise. Thus, moving from the fourth state also denoted the noise state may require a number, e.g., 40, of data samples with no noise.

The monitor device 6, e.g., when the first sensor state is the fourth state, is optionally configured to determine if a fifth secondary criterion CR_5_2_1 is satisfied, and in accordance with the fifth secondary criterion being satisfied, setting the first sensor state to the fifth state. The fifth secondary criterion, CR_5_2_1 for the first sensor may be given by:

$$CR\_5\_2\_1: V\_1 < TH\_8 \text{ AND } TC\_1 >= TH\_7,$$

where TH_8 and TH_7 are thresholds. The tertiary counter may be indicative of the number of sensor data samples with no noise. Thus, moving from the fourth state also denoted the noise state may require a number, e.g., 40, of data samples with no noise.

In monitor device 6, to determine a second sensor state for the second sensor comprises setting the second sensor state to a default state; determining if a first criterion also denoted CR_1_2 is satisfied, and in accordance with the first criterion being satisfied, setting the second sensor state to a first state.

In monitor device 6, to determine a second sensor state comprises determining if a second criterion is satisfied, and in accordance with the second criterion being satisfied, setting the second sensor state to a second state.

The monitor device 6 is optionally configured to determine sensor states SS_1, SS_2, . . . , SS_M for M sensors $S\_1, S\_2, \ldots, S\_M$ by applying criteria $CR\_1\_i, CR\_2\_i, CR\_3\_i, CR\_4\_i, CR\_5\_1\_i, CR\_5\_2, CR\_3\_2\_i$, and $CR\_D\_i$ for i=1–M as explained above exemplified for i=1. The number M of sensors in the personal care appliance may be in the range from three to ten, such as 4, 5, 6, or 7.

Thus, it is to be understood that the description of determining a first sensor state for a first sensor of the personal care appliance also applies to determining a second sensor state for a second sensor of the personal care appliance, to determining a third sensor state for a third sensor of the personal care appliance, to determining a fourth sensor state for a fourth sensor of the personal care appliance, and optionally to determining a fifth sensor state for a fifth sensor of the personal care appliance.

In monitor device 6, to output a first sensor state identifier indicative of the first sensor state and a second sensor state identifier indicative of the second sensor state comprises transmitting the first sensor state identifier and/or the second sensor state identifier to the accessory device as part of a personal care appliance status vector. The monitor device 6 is optionally configured to transmit sensor state identifiers $SSI\_1, SSI\_2, \ldots SSI\_M$ for respective sensors $S\_1, S\_2, \ldots, S\_M$ as part of a personal care appliance status vector.

Figure 3:
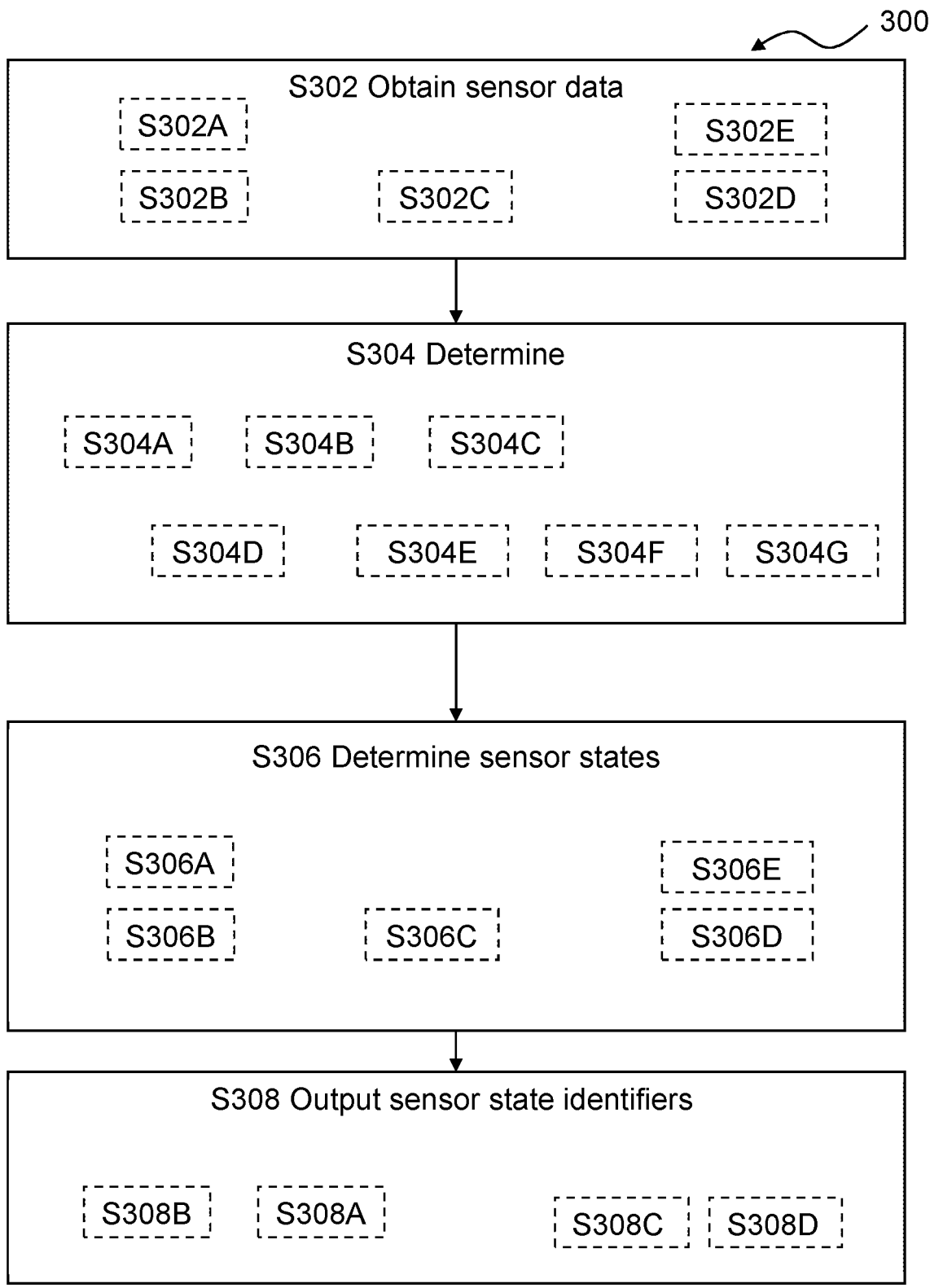
FIG. 3 is a flow diagram of an example method of operating a monitor device for a personal care system according to the present disclosure.
Figure 5:
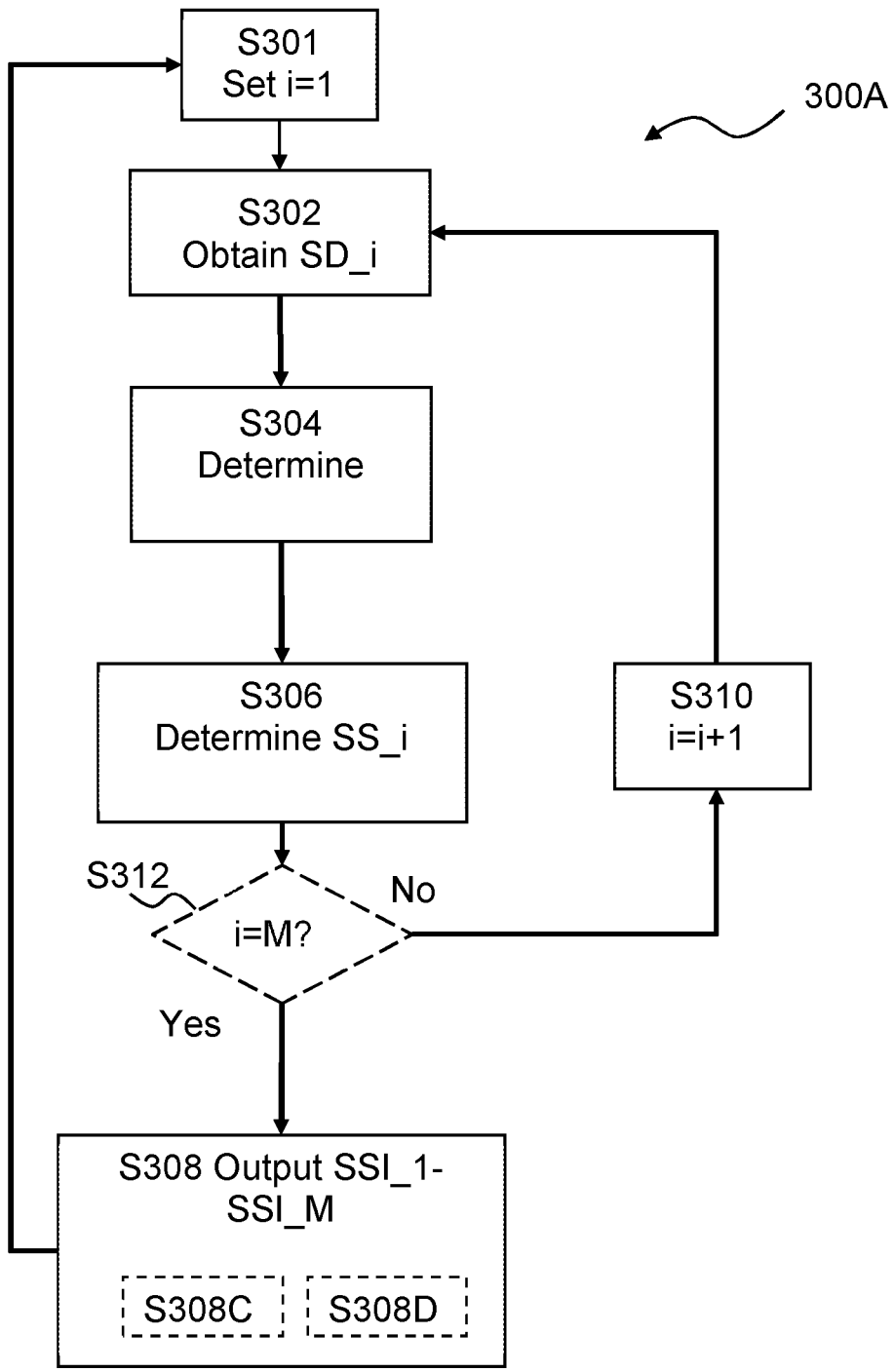
FIG. 5 is a flow diagram of an example method of operating a monitor device for a personal care system according to the present disclosure.

The processor 101 may be optionally configured to perform any of the operations disclosed in FIG. 3 and FIG. 5 (such as any one or more of S302, S304, S306, S308). The operations of the monitor device 100 may be embodied in the form of executable logic routines (such as, lines of code, software programs, etc.) that are stored on a non-transitory computer readable medium (such as, internal memory in the processor 101 or external memory) and are executed by the processor 101).

Furthermore, the operations of the monitor device 100 may be considered a method that the monitor device 100 is configured to carry out. Also, while the described functions and operations may be implemented in software, such functionality may as well be carried out via dedicated hardware or firmware, or some combination of hardware, firmware and/or software.

The memory 106 and/or 106A may be one or more of a buffer, a flash memory, a hard drive, a removable media, a volatile memory, a non-volatile memory, a random access memory (RAM), or other suitable device. In a typical arrangement, the memory 106 may include a non-volatile memory for long term data storage and a volatile memory that functions as system memory for the processor 106. The memory 106, 106A may exchange data with the processor 101 over a data bus. Control lines and an address bus between the memory 101 and the processor 402 may also be present (not shown in FIG. 2). The memory 106, 106A is considered a non-transitory computer readable medium.

FIG. 3 shows a flow diagram of an exemplary method 300 of operating a monitor device for a personal care system comprising a personal care appliance, the monitor device (such as monitor device 6 of FIG. 2), and an accessory device.

The method 300 comprises obtaining S302 sensor data from M sensor(s) of a personal care appliance including obtaining S302A first sensor data from a first sensor of the personal care appliance and obtaining S302B second sensor data from a second sensor of the personal care appliance. Obtaining S302 sensor data from sensor(s) of a personal care appliance optionally includes obtaining S302C third sensor data from a third sensor of the personal care appliance and/or obtaining S302D fourth sensor data from a fourth sensor of the personal care appliance. Obtaining S302 sensor data from sensor(s) of a personal care appliance optionally includes obtaining S302E fifth sensor data from a fifth sensor of the personal care appliance.

The method 300 comprises determining/updating S304 parameters, values, and counter(s) including one or more of primary parameters $PP\_i$, primary values $PV\_i$, primary counters $PC\_i$, secondary parameters $SP\_i$, optionally secondary values $SV\_i$, secondary counters $SC\_i$, and tertiary counters $TC\_i$ for respective sensors $S\_i$ wherein i=1–M.

Determining S304 comprises determining S304A primary parameters $PP\_i$, determining S304B primary values $PV\_i$, updating S304C primary counters $PC\_i$, determining S304D secondary parameters $SP\_i$, optionally determining S304E secondary values, updating S304F secondary counters $SC\_i$, and updating S304G tertiary counters $TC\_i$ for i=1–M.

The method 300 comprises determining S306 sensor state for sensors of the personal care appliance including determining S306A a first sensor state $SS\_1$ of the first sensor $S\_1$ based on the first sensor data $SD\_1, PP\_1, PV\_1, PC\_1, SP\_1, SV\_1, SC\_1$, and $TC\_1$ and optionally determining S306B a second sensor state $SS\_2$ of the second sensor $S\_2$ based on the second sensor data $S\_2 PP\_2, PV\_2, PC\_2, SP\_2, SV\_2, SC\_2$, and $TC\_2$.

Determining S306 sensor state for respective sensors of the personal care appliance optionally comprises determining S306C a third sensor state $SS\_3$ of the third sensor $S\_3$ based on the third sensor data $SD\_3 PP\_3, PV\_3, PC\_3, SP\_3, SV\_3, SC\_3$, and $TC\_3$, determining S306D a fourth sensor state $SS\_4$ of the fourth sensor $S\_4$ based on the fourth sensor data $SD\_4 PP\_4, PV\_4, PC\_4, SP\_4, SV\_4, SC\_4$, and $TC\_4$, and determining S306E a fifth sensor state $SS\_5$ of the fifth sensor $S\_5$ based on the fifth sensor data $SD\_5 PP\_5, PV\_5, PC\_5, SP\_5, SV\_5, SC\_5$, and $TC\_$.

The method 300 comprises outputting S308 sensor state identifiers indicative of the sensor states including outputting S308A a first sensor state identifier indicative of the first sensor state and outputting S308B a second sensor state identifier indicative of the second sensor state. Outputting S308 optionally comprises including S308C sensor state identifiers determined in S306 in a personal care appliance status vector PCASV and transmitting S308D the personal care appliance status vector to the accessory device, e.g., accessory device 8. It is to be noted that determination of one or more of primary parameter, primary value, primary counter, secondary parameter, secondary value, secondary counter, and tertiary counter may be performed as a part of determining a sensor state, e.g., as part of evaluation of one or more criteria.

Figure 4:
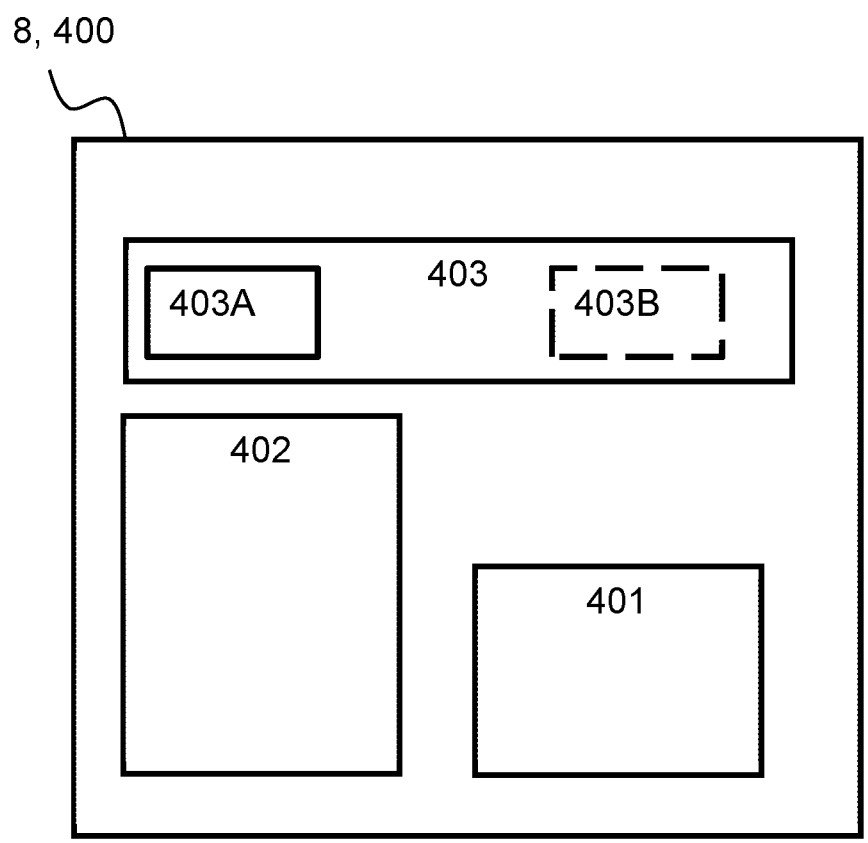
FIG. 4 is a block diagram illustrating an exemplary accessory device according to the present disclosure.

FIG. 4 is a block diagram illustrating an exemplary accessory device 400 according to the present disclosure. The accessory device 400 forms part of a personal care system, such as an ostomy system or a wound dressing system and is capable of supporting the monitoring of the operating state of an ostomy appliance or a wound dressing appliance to be placed on a user's skin. The accessory device 400 comprises a memory 401; a processor 402 coupled to the memory 401; and an interface 403, coupled to the processor 402.

Peripheral devices, such as memory 401 and/or interface 403 can be operatively and communicably coupled to the processor 402 via a bus for communicating data. The processor 402 can be a central processing unit (CPU), but other suitable microprocessors are also contemplated.

The interface 403 is configured to connect the accessory device to the monitor device of the personal care system, the interface comprising a transceiver module 403A connected to the processor 402.

The interface 403 may be configured to communicate with one or more devices of the personal care system. The one or more devices comprises a monitor device and/or a personal care appliance configured to be placed on a skin surface of a user or on any additional seals. The interface 403 may comprise a display 403B as a visual interface to the user. The interface 403 is configured to establish a connection between the monitor device and the accessory device.

The interface 403 is configured to receive monitor data, such as one or more sensor state identifiers and/or personal care appliance status vector(s) from the monitor device. The monitor data may be indicative of a condition or operating state of the personal care appliance and/or condition of sensor(s) of the personal care appliance, such as a condition of a proximal side of a layer of the personal care appliance that is directed towards the skin surface or a condition of an absorbent core layer of the personal care appliance. In one or more exemplary accessory devices, the monitor data comprises one or more sensor state identifiers and/or personal care appliance status vector(s) determined by processor of the monitor device based on sensor data obtained via the first interface 102 from an ostomy appliance being the personal care appliance or from a wound dressing being the personal care appliance, respectively. In other words, the accessory device 8, 400 is configured to obtain sensor state identifiers including to obtain a first sensor state identifier indicative of sensor state of a first sensor of the personal care appliance and obtain a second sensor state identifier indicative of sensor state of a second sensor of the personal care appliance. The accessory device, e.g., the processor, may be configured to determine an operating state of the personal care appliance based on the sensor state identifiers including the first sensor state identifier and/or the second sensor state identifier; and communicate the operating state of the personal care appliance via the interface 403, e.g., by displaying a user interface on display 403B.

The memory 401 may be configured to store the sensor state identifiers and/or the operating state.

The operations of the accessory device 400 may be embodied in the form of executable logic routines (such as, lines of code, software programs, etc.) that are stored on a non-transitory computer readable medium (such as, the memory 401) and are executed by the processor 402).

Furthermore, the operations of the accessory device 400 may be considered a method that the accessory device 400 is configured to carry out. Also, while the described functions and operations may be implemented in software, such functionality may as well be carried out via dedicated hardware or firmware, or some combination of hardware, firmware and/or software.

The memory 401 may be one or more of a buffer, a flash memory, a hard drive, a removable media, a volatile memory, a non-volatile memory, a random access memory (RAM), or other suitable device. In a typical arrangement, the memory 401 may include a non-volatile memory for long term data storage and a volatile memory that functions as system memory for the processor 402. The memory 401 may exchange data with the processor 402 over a data bus. Control lines and an address bus between the memory 401 and the processor 402 also may be present (not shown in FIG. 4). The memory 401 is considered a non-transitory computer readable medium.

FIG. 5 shows a flow diagram of an example method 300A of operating a monitor device, where the personal care appliance comprises M=5 sensors. An index i is initialized by setting i=1 to indicate the first sensor S_i in S301. Sensor data SD_i are obtained in S302, and parameters, values, and counters PP_i, PV_i, PC_i, SP_i, SV_i, SC_i, and TC_i are determined/updated in S304 for i=1. The sensor state SS_i for i=1 is determined in S306 based on one or more of PP_i, PV_i, PC_i, SP_i, SV_i, SC_i, and TC_i. The method 300A determines if all sensor states are determined in S312 (i.e., if index i=M being the number of sensors) and if not all sensor states are determined, index i is incremented (i=i+1) in S310 and the method returns to S302. If all sensor states i=1, . . . , M have been determined, the method 300A proceeds to outputting S308 sensor state identifiers SSI_1-SSI_M by including S308C the sensor state identifiers SSI_1-SSI_M in a personal care appliance status vector PCASV and transmitting S308D PCASV, e.g., to an accessory device. The sensor state identifiers may be set to values of the respective sensor states, e.g. SSI_i may be set to SS_i for all i=1, . . . , M.

The sensor state identifiers SSI_1-SSI_M are indicative of respective sensor states SS_1-SS_M of sensors S_1-S_M. For example, if the first sensor state SS_1 for the first sensor is the first state, SSI_1="1". For example, if the first sensor state SS_1 for the first sensor is the second state, SSI_1="2". For example, if the first sensor state SS_1 for the first sensor is the third state, SSI_1="3". For example, if the first sensor state SS_1 for the first sensor is the fourth state, SSI_1="4". For example, if the first sensor state SS_1 for the first sensor is the second state, SSI_1="5". For example, if the first sensor state SS_1 for the first sensor is the default state, SSI_1="0".

Figure 6:
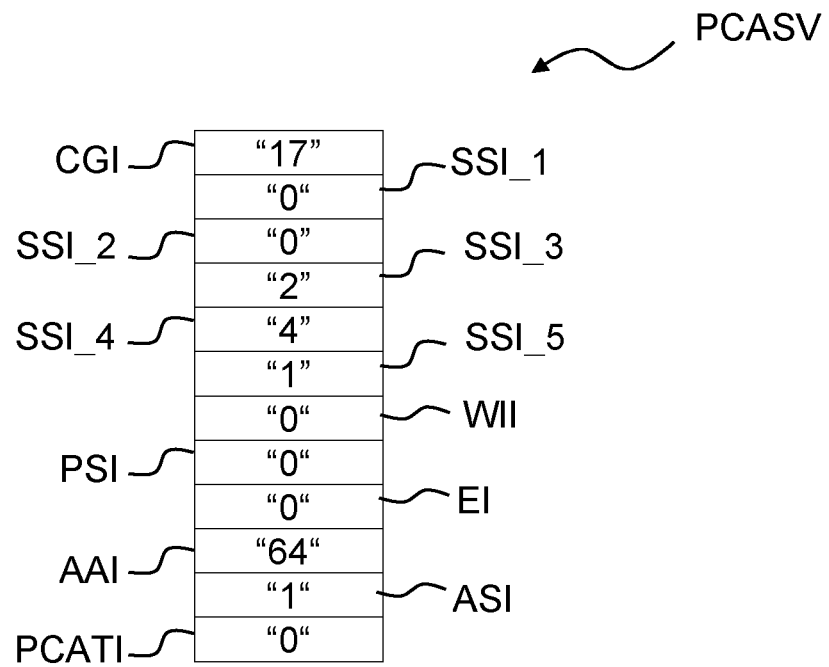
FIG. 6 shows an exemplary personal care appliance status vector according to the present disclosure.

FIG. 6 illustrates an exemplary personal care appliance status vector for a personal care appliance comprising five sensors S_1-S_5. The personal care appliance status vector PCASV comprises a number of sensor state identifiers corresponding to the number of sensors, i.e., a first sensor state identifier SSI_1 indicative of the sensor status SS_1 of the first sensor S_1, a second sensor state identifier SSI_2 indicative of the second sensor status SS_2 of the second sensor S_2, a third sensor state identifier SSI_3 indicative of the third sensor status SS_3 of the third sensor S_3, a fourth sensor state identifier SSI_4 indicative of the fourth sensor status SS_4 of the fourth sensor S_4, and a fifth sensor state identifier SSI_5 indicative of the fifth sensor status SS_5 of the fifth sensor S_5. In the illustrated example, SSI_1=0 indicating that the first sensor is in default state, SSI_2=0 indicating that the second sensor is in default state, SSI_3=2 indicating that the third sensor is in second state, SSI_4=4 indicating that the fourth sensor is in fourth state, and SSI_5=1 indicating that the fifth sensor is in first state. The sensor state identifiers SSI_1-SSI_5 are optionally 8-bit unsigned integers.

The PCASV may comprise a water ingress indicator WII optionally being an 8-bit unsigned integer, where the value of WII indicates if water ingress has been detected in the interface/connector between the monitor device and the personal care appliance. WII="0" may indicate no water ingress and WII="1" may indicate water ingress.

The PCASV may comprise further indicator(s) and/or identifier(s) indicating status of the personal care appliance and/or the monitor device. In one or more exemplary monitor devices, the personal care appliance status vector also denoted status data package has a size of 20 bytes or less.

The PCASV optionally comprises an attachment status indicator ASI indicative of whether the monitor device is attached to a personal care appliance. The ASI may have a length of 8 bits or less than 8 bits. The ASI may be an 8-bit unsigned integer.

The PCASV optionally comprises a cut or stress guard indicator CGI indicative of a risk whether one or more sensors of the personal care appliance will be cut, have been cut or otherwise will or have been damaged or broken. The CGI may have a length of 8 bits or less than 8 bits. The CGI may be an 8-bit unsigned integer.

The PCASV optionally comprises a personal care appliance type identifier PCATI indicative of the type or model of the personal care appliance. The PCATI may have a length of 8 bits or less than 8 bits. The PCATI may be an 8-bit unsigned integer.

The PCASV optionally comprises an application angle indicator AAI indicative of the mounting angle of the personal care appliance and/or a power status indicator PSI indicative of the power status of the monitor device. The AAI and/or the PSI may have a length of 8 bits or less than 8 bits. The AAI and/or the PSI may be an 8-bit unsigned integer.

The PCASV optionally comprises an error indicator EI indicative of an error in the monitor device and/or the personal care appliance. The EI may have a length of 8 bits or less than 8 bits. The EI may be an 8-bit unsigned integer.

Figure 7:
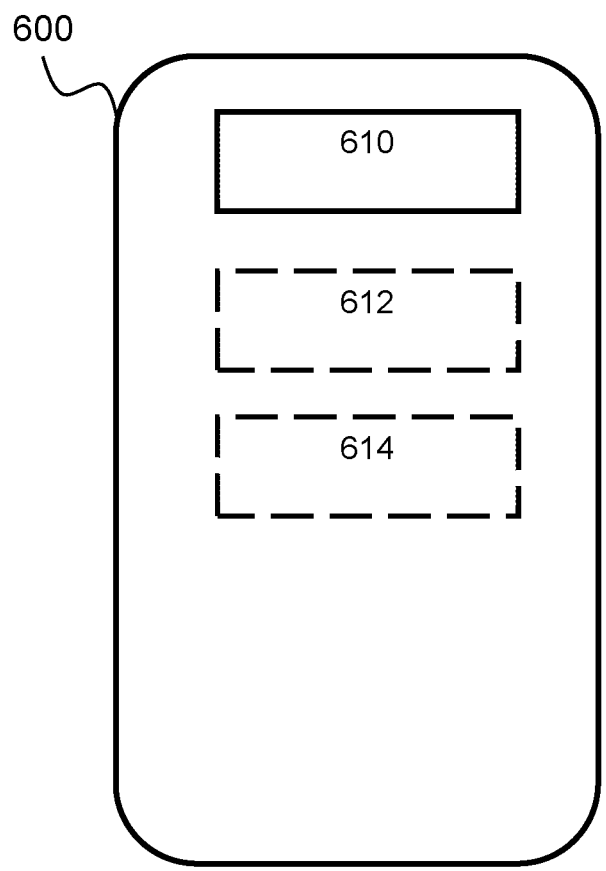
FIG. 7 shows one or more exemplary user interfaces for communicating the first indication according to the present disclosure.

FIG. 7 illustrates one or more exemplary user interfaces for communicating the operating state of the personal care appliance according to the present disclosure. FIG. 7 shows an exemplary user interface 600 for communicating the operating state of the personal care appliance via a visual interface of the accessory device, such as a display of the accessory device.

The user interface 600 comprises a first user interface object 610 representative of the operating state of the personal care appliance. The first user interface object 610 may be displayed as one or more media, such as text, graphic and/or video.

The first user interface object 610 may be user-interactive, or selectable by a user input. For example, an image (e.g., icon), a button, and text (e.g., hyperlink) each optionally constitute the first user interface object 610. The first user interface object 610 may form part of a widget.

The user interface 600 may comprise one or more, such as a plurality of user interface objects. For example, the user interface may comprise a first primary user interface object 612 representative of a sensor state of a sensor as indicated by the sensor state identifier. For example, the user interface may comprise a first secondary user interface object 614 representative of a sensor state of a sensor as indicated by the sensor state identifier.

The accessory device is optionally configured to change dynamically the visual appearance of any of the user interface objects 610, 612, 614 based on the operating state and/or sensor state, e.g., in terms of text, colour, shape, form, contrast, brightness, animation and/or blurring to indicate the operating state. For example, the severity of the operating state may be displayed, by the accessory device, by varying in colour: e.g., blue, yellow, red for indicating low, medium, high severity, respectively. For example, the severity of the operating state may be displayed, by the accessory device, by varying shades within a colour from a lighter shade to a darker shade for indicating low to high severity respectively. For example, the severity of the operating state may be displayed, by the accessory device, by varying a magnitude of the visual effect (e.g., less blurring, sharper contrast) as severity increases.

For example, the user interface object 610 and/or 612, and/or 614 may be representative of an operating state indicating to change NOW the personal care by adopting, e.g., the colour red, in a dark shade, in sharp contrast.

In one or more exemplary user interfaces, the user interface 600 comprises user interface objects 610, 612, 614 which separately or together, display a text prompt indicating to the user the operating state and/or or sensor state. A text prompt may for example indicate: "Sensors ok—Everything is fine", "Sweat detected—Everything is fine", "Sensors ok—Pay attention", "Sensors noisy—Check again in 5 minutes", "One or more sensors blinded—Consider change".

For example, the user interface object 610 and/or 612, and/or 614 may be displayed as one or more notifications, such as in a notification centre displayed on the display.

The accessory device may be configured to provide the user interface 600 in a user application running on the processor. The user application may be a dedicated personal care application that assist the user in monitoring the internal operating state of the personal care appliance.

The accessory device may be configured to provide the user interface 600 on a lock screen displayed by the accessory device.

The accessory device may be configured to provide the user interface 600 on a home screen displayed by the accessory device.

Figure 8:
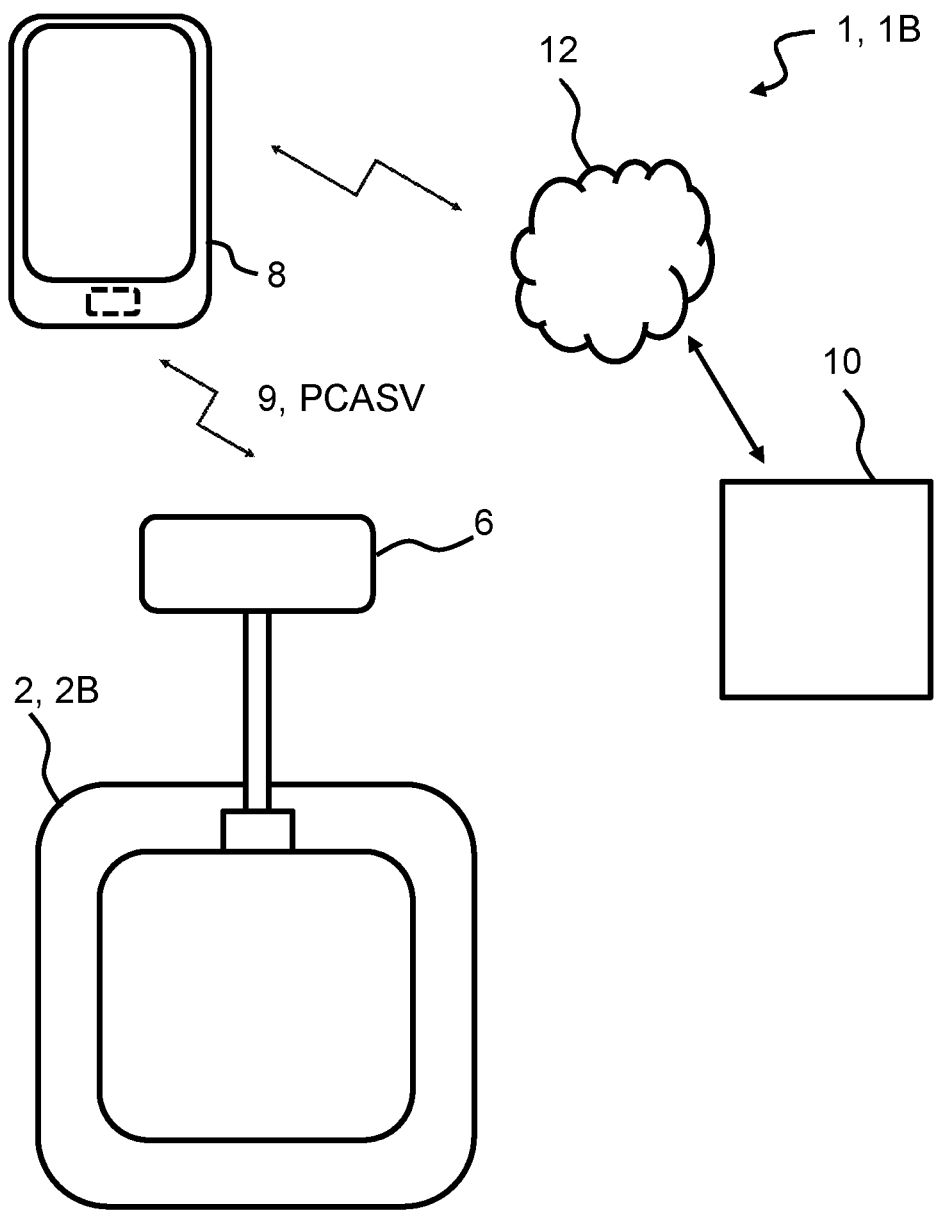
FIG. 8 illustrates an exemplary personal care system being a wound dressing system.

FIG. 8 illustrates an exemplary personal care system 1 embodied as a wound dressing system 1A. The personal care system 1 (ostomy system 1A) comprises a personal care appliance 2 embodied as an ostomy appliance 2A including a base plate 4 and an ostomy pouch (not shown). Further, the personal care system 1 comprises a monitor device 6 and an accessory device 8 (mobile telephone, smartphone). The monitor device 6 is connectable to the personal care appliance 2, such as to base plate 4 and/or to an electrode assembly of or mounted to the personal care appliance, via respective first connectors of the monitor device 6 and base plate 4/electrode assembly.

Figure 9:
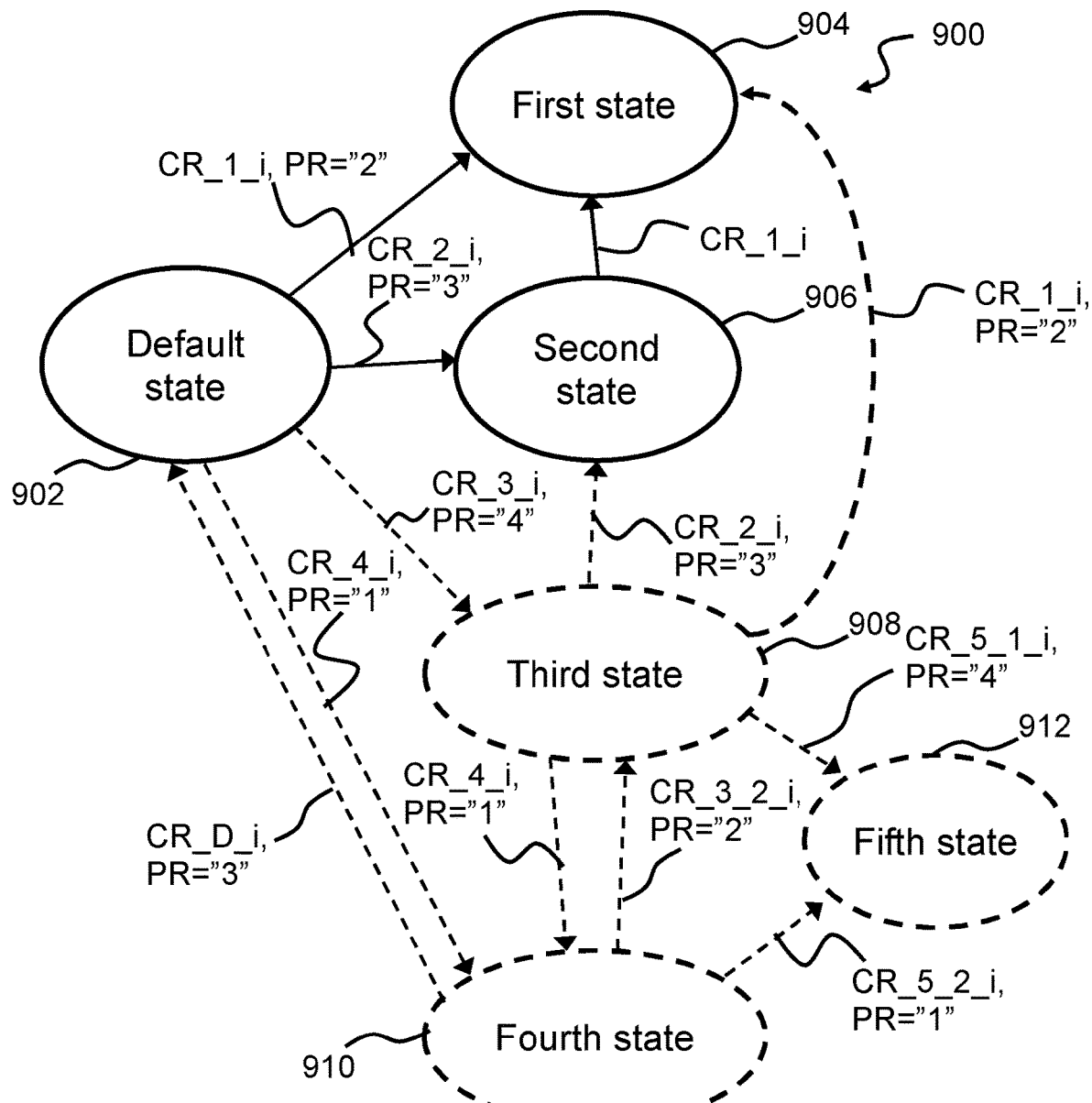
FIG. 9 shows an exemplary state machine for determining sensor state(s)

FIG. 9 illustrates an exemplary state machine for determining a sensor state of a sensor, such as one or more, e.g., all of, SS_1 for S_1, SS_2 for S_2, SS_3 for S_3, SS_4 for S_4, and SS_5 for S_5 of personal care appliance 2. A new data vector including sensor data SD_i for i'th sensor is supplied to the state machine optionally with a frequency of 0.1 Hz. Each cycle of the state machine starts with determining/updating parameters, values, and counters, PP_i, PV_i, PC_i, SP_i, SV_i, SC_i, and TC_i followed by determining if one or more criteria is satisfied and setting the sensor state accordingly.

Determining a sensor state starts in the Default state (associated sensor state identifier of "0") by setting the sensor state SS_i to the Default state (SS_i=0). Accordingly, the sensor state is initiated with the default state. The monitor device determines sensor state SS_i for i'th sensor by determining, when in the default state, if one of criteria CR_4_i, CR_1_i, CR_2_i, and CR_3_i are satisfied and set or update the sensor state accordingly. The priorities PR associated with each criterion indicates the order of assessment of the criteria, i.e., criterion CR_4_i is assessed first, CR_1_i is assessed second, CR_2_i is assessed third, and CR_3_i is assessed fourth. If none of CR_4_i, CR_1_i, CR_2_i, and CR_3_i are satisfied, the state machine stays in the default state. The first state (leak state) and the fifth state (blinded state) are end states for the state machine, i.e., no transitions take place from the first state and the fifth state.

When in the second state, the monitor device determines sensor state SS_i for i'th sensor by determining if the first criterion CR_1_i is satisfied and set or update the sensor state SS_i to the first state by setting SS_i=1 in accordance with the first criterion being satisfied. If CR_1_i is not satisfied, the state machine stays in the second state.

When in the third state, the monitor device determines sensor state SS_i for i'th sensor by determining if one of CR_4_$i$, CR_1_$i$, CR_2_$i$, and CR_5_1_$i$ is satisfied and set or update the sensor state accordingly. The priorities PR associated with each criterion in the third state indicates the order of assessment of the criteria, i.e., criterion CR_4_$i$ is assessed first, CR_1_$i$ is assessed second, CR_2_$i$ is assessed third, and CR_5_1_$i$ is assessed fourth. If none of CR_4_$i$, CR_1_$i$, CR_2, and CR_5_1_$i$ are satisfied, the state machine stays in the third state. The third state may be a state where a sensor determines an increase in moisture level which may arise from sweat of the user. Accordingly, a sensor state machine including a third state optionally reduces the number of false positives (leak detected) by including a sensor state where the sensor is not dry but on the other hand does not detect output or bodily fluid to a sufficiently large degree.

When in the fourth state, the monitor device determines sensor state SS_i for i'th sensor by determining if one of CR_5_2_$i$, CR_3_2_$i$, and CR_D_$i$ is satisfied and set or update the sensor state accordingly. If CR_5_2_$i$ is satisfied, the sensor state SS_i is set to the fifth state (SS_i=5), if CR_3_2_$i$ is satisfied, the sensor state SS_i is set to the third state (SS_i=3), and if CR_D_$i$ is satisfied, the sensor state SS_i is set to the default state (SS_i=0). The priorities PR associated with each criterion in the fourth state indicates the order of assessment of the criteria, i.e., criterion CR_5_2_$i$ is assessed first, CR_3_2_$i$ is assessed second, and CR_D_$i$ is assessed third. If none of CR_5_2_$i$, CR_3_2_$i$, and CR_D_$i$ are satisfied, the state machine stays in the fourth state. The fourth state may be a state where a sensor detects noise or a noisy signal. Accordingly, a sensor state machine including a fourth state optionally improves the accuracy of the sensor by including a sensor state where the sensor detects noise, in turn reducing the number of false positives for the first state and/or the second state.

The priorities PR associated with each criterion indicates the order of assessment of the criteria, i.e., criterion CR_4_$i$ is assessed first, CR_1_$i$ is assessed second, CR_2_$i$ is assessed third, and CR_3_$i$ is assessed fourth. If none of CR_4_$i$, CR_1_$i$, CR_2_$i$, and CR_3_$i$ are satisfied, the state machine stays in the default state. The first state (leak state) and the fifth state (blinded state) are end states for the state machine, i.e. no transitions take place from the first state and the fifth state.

Figure 10:
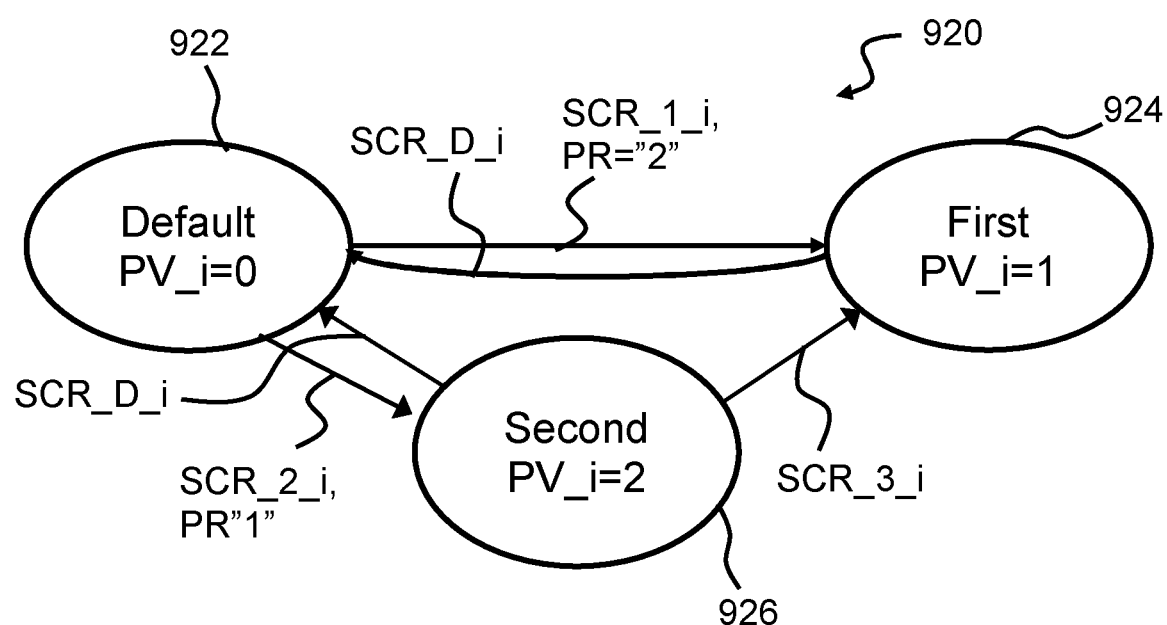
FIG. 10 shows an exemplary secondary state machine for determining a primary value and a primary counter.

FIG. 10 illustrates an exemplary secondary state machine for updating/determining a primary value PV_i and a primary counter PC_i. The secondary state machine determines/uses the primary parameter PP_i as basis for state changes. In other words, determining a primary value PV_i and/or a primary counter PC_i may be based on a secondary state machine. Determining/updating a primary value starts in the Default secondary state, where PV_i is set to "0" and primary counter PC_i is set to "0". The monitor device determines primary value PV_i for i'th sensor by determining, when in the default secondary state, if one of secondary criteria SCR_2_$i$ and SCR_1_$i$ are satisfied and set or update the primary value PV_i accordingly. The priorities PR associated with each criterion indicates the order of assessment of the criteria, i.e., criterion SCR_2_$i$ is assessed first and SCR_1_$i$ is assessed second. The monitor device determines the primary value PV_i for i'th sensor by determining, when in the default secondary state, if one of secondary criteria SCR_1_$i$, and SCR_2_$i$ are satisfied and set or update the primary value PV_i accordingly.

In accordance with the first secondary criteria SCR_1_$i$ being satisfied, the monitor device switches to first secondary state for i'th sensor and sets PV_i="1". The first secondary criterion SCR_1_$i$ may be given by:

$$\text{SCR\_1\_}i:\text{PP\_}i \geq \text{STH\_1 AND PC\_}i=0,$$

where PP_i is the primary parameter for the i'th sensor and, STH_1 is a threshold, and PC_i is the primary counter of the i'th sensor. In accordance with SCR_1_$i$ being satisfied, the monitor device moves to first secondary state, sets PV_i=1, and optionally increments the primary counter PC_i.

Determining/updating a primary value and/or primary counter comprises, when in the first secondary state, to determine if a default secondary criterion SCR_D_i is satisfied. In accordance with SCR_D_i being satisfied, the monitor device moves to default secondary state, sets PV_i=0 and optionally resets PC_1 to 0. The default secondary criterion may be given by:

$$\text{SCR\_D\_}i:\text{PC\_}i > S\_\text{VALUE},$$

Where PC_i is the primary counter of the i'th sensor and S_value is a number. If SCR_D_i is not satisfied, the secondary state machine stays in the first secondary state.

In accordance with the second secondary criteria SCR_2_$i$ being satisfied, the monitor device switches to second secondary state for i'th sensor. The second secondary criterion SCR_2_$i$ may be given by:

$$\text{SCR\_2\_}i:\text{PP\_}i \geq \text{STH\_2 AND PC\_}i=0,$$

where PP_i is the primary parameter for the i'th sensor, STH_2 is a threshold, and PC_i is the primary counter of the i'th sensor. In accordance with SCR_2_$i$ being satisfied, the monitor device moves to second secondary state, sets PV_i=2, and optionally increments the primary counter PC_i.

Determining/updating a primary value and/or primary counter comprises, when in the second secondary state, to determine if a default secondary criterion SCR_D_i is satisfied. In accordance with SCR_D_i being satisfied, the monitor device moves to default secondary state, sets PV_i=0, and optionally resets PC_1 to 0.

Determining/updating a primary value and/or primary counter comprises, when in the second secondary state, to determine if a third secondary criterion SCR_3_$i$ is satisfied. In accordance with SCR_3_$i$ being satisfied, the monitor device moves to first secondary state, sets PV_i=1, and optionally increments the primary counter PC_i. The third secondary criterion SCR_3_$i$ may be given by:

$$\text{SCR\_3\_}i:\text{PP\_}i > \text{STH\_1 AND PC\_}i \leq S\_\text{VALUE}.$$

If none of SCR_D_i and SCR_3_1 are satisfied, the secondary state machine stays in the second secondary state and optionally increments the primary counter PC_i.

In one or more examples, the primary counter is updated, e.g., incremented or reset, prior to evaluation of secondary criteria, e.g., based on the primary value.

The use of the terms "first", "second", "third" and "fourth", "primary", "secondary", "tertiary" etc. does not imply any particular order but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-8 comprise some modules or operations which are illustrated with a solid line and some modules or operations which are illustrated with a dashed line. The modules or operations which are comprised in a solid line are modules or operations which are comprised in the broadest exemplary embodiment. The modules or operations which are comprised in a dashed line are exemplary embodiments which may be comprised in, or a part of, or are further modules or operations which may be taken in addition to the modules or operations of the solid line exemplary embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly, to be regarded in an illustrative rather than restrictive sense. The claimed invention is intended to cover all alternatives, modifications, and equivalents.

LIST OF REFERENCES

1 personal care system
1A ostomy system
1B wound dressing system
2 personal care appliance
2A ostomy appliance
2B wound dressing appliance
4 base plate
6 monitor device
8 accessory device
9 connection
10 server device
12 network
14 coupling member
16 coupling ring
18 stoma-receiving opening
19 centre of the opening
20 docking station
22 first connector
24 user interface
100 monitor device housing
101 processor
102 first interface
104 second interface
106, 106A memory
108 ground terminal of monitor device
110 first terminal of monitor device
112 second terminal of monitor device
114 third terminal of monitor device
116 fourth terminal of monitor device
118 fifth terminal of monitor device
120 coupling part
121 power unit
122 antenna
124 wireless transceiver, transceiver module
126 loudspeaker
128 haptic feedback element
140 sensor unit
300, 300A method of operating a monitor device for a personal care system
S301 initializing index i
S302 obtaining sensor data SD_i from M sensors 5_i for i=1, M of a personal care appliance
S302A obtaining first sensor data from a first sensor
S302B obtaining second sensor data from a second sensor
S302O obtaining third sensor data from a third sensor
S302D obtaining fourth sensor data from a fourth sensor
S302E obtaining fifth sensor data from a fifth sensor
S304 determining/updating parameters, values, and counter(s)
S304A determining primary parameters PP_i
S304B determining primary values PV_i
S3040 updating primary counters PC_i
S304D determining secondary parameters SP_i
S304E determining secondary values SV_i
S304F updating secondary counters SC_i
S304G updating tertiary counters TC_i
S306 determining a sensor state for sensors of the personal care appliance
S306A determining a first sensor state SS_1 of the first sensor S_1
S306B determining a second sensor state SS_2 of the second sensor S_2
S306C determining a third sensor state SS_3 of the third sensor S_3
S306D determining a fourth sensor state SS_4 of the fourth sensor S_4
S306E determining S306E a fifth sensor state SS_5 of the fifth sensor S_5
S308 outputting sensor state identifiers indicative of the sensor states
S308A outputting a first sensor state identifier indicative of the first sensor state
S308B outputting a second sensor state identifier indicative of the second sensor state S308C including sensor state identifiers in a personal care appliance status vector
S308D transmitting the personal care appliance status vector
S310 determining if all sensor states are determined
S312 incrementing index i
400 accessory device
401 memory of accessory device
402 processor of accessory device
403 interface of accessory device
403 transceiver
403B display
600 user interface
610 first user interface object
612 first primary user interface object
614 first secondary user interface object
900 state machine for determining sensor state
902 default state
904 first state
906 second state
908 third state
910 fourth state
912 fifth state
920 secondary state machine for determining primary value and primary counter
922 default secondary state
924 first secondary state
926 second secondary state
PCASV personal care appliance status vector
PV_i i'th primary value
PC_i i'th primary counter
PP_i i'th primary parameter
S_i i'th sensor
SS_i i'th sensor state
SSI_i i'th sensor state identifier
SV_i i'th secondary value
SC_i i'th secondary counter
SP_i i'th secondary parameter
WII water ingress indicator

The invention claimed is:

1. A monitor device for a personal care system, the monitor device comprising:
a processor;
a memory connected to the processor;
a first interface connected to the processor, the first interface configured for connecting the monitor device to a personal care appliance of the personal care system; and
a second interface comprising a transceiver module connected to the processor and configured for connecting the monitor device to an accessory device of the personal care system,
wherein the monitor device is configured to:
obtain first sensor data from a first sensor of the personal care appliance;
obtain second sensor data from a second sensor of the personal care appliance;
determine a first sensor state of the first sensor based on the first sensor data,
wherein to determine the first sensor state comprises:
setting the first sensor state to a default state;
determining if a first criterion is satisfied;
in accordance with the first criterion being satisfied, setting the first sensor state to the first state;
determining if a second criterion is satisfied; and
in accordance with the second criterion being satisfied, setting the first sensor state to a second state;
determine a second sensor state of the second sensor based on the second sensor data; and
output a first sensor state identifier indicative of the first sensor state and a second sensor state identifier indicative of the second sensor state.

2. The monitor device according to claim 1, wherein to determine a first sensor state based on the first sensor data comprises selecting the first sensor state from more than three sensor states, and wherein to determine a second sensor state based on the second sensor data comprises selecting the second sensor state from more than three sensor states.

3. The monitor device according to claim 1, wherein the monitor device is configured to:
obtain third sensor data from a third sensor of the personal care appliance;
determine a third sensor state of the third sensor based on the third sensor data; and
output a third sensor state identifier indicative of the third sensor state.

4. The monitor device according to claim 1, wherein determining if a first criterion is satisfied comprises determining a primary parameter based on the first sensor data; updating a primary value based on the primary parameter; and wherein the first criterion is based on the primary value.

5. The monitor device according to claim 4, wherein determining if a first criterion is satisfied comprises updating a primary counter in accordance with the primary value; and wherein the first criterion is based on the primary counter.

6. The monitor device according to claim 1, wherein to determine a first sensor state comprises:
determining, when the first sensor state is the default state, if a third criterion is satisfied;
in accordance with the third criterion being satisfied, setting the first sensor state to a third state;
determining, when the first sensor state is the default state, if a fourth criterion is satisfied; and
in accordance with the fourth criterion being satisfied, setting the first sensor state to a fourth state.

7. The monitor device according to claim 6, wherein the third criterion is based on first primary sensor data indicative of a voltage of the first sensor data.

8. The monitor device according to claim 6, wherein determining if a fourth criterion is satisfied comprises determining a secondary parameter based on the first sensor data; updating a secondary counter in accordance with the secondary parameter; and wherein the fourth criterion is based on the secondary counter.

9. The monitor device according to claim 6, wherein the monitor device, when the first sensor state is the third state, is configured to:
determine if the first criterion is satisfied;
in accordance with the first criterion being satisfied, setting the first sensor state to the first state;
determine if the second criterion is satisfied; and
in accordance with the second criterion being satisfied, setting the first sensor state to the second state;
determine if the fourth criterion is satisfied;
in accordance with the fourth criterion being satisfied, setting the first sensor state to the fourth state;
determine if a fifth primary criterion is satisfied;
in accordance with the fifth primary criterion being satisfied, setting the first sensor state to a fifth state.

10. The monitor device according to claim 6, wherein the monitor device, when the first sensor state is the fourth state, is configured to:

determine if a third secondary criterion is satisfied; and
in accordance with the third secondary criterion being satisfied, setting the first sensor state to the third state;
determine if a fifth secondary criterion is satisfied;
in accordance with the fifth secondary criterion being satisfied, setting the first sensor state to a fifth state.

11. The monitor device according to claim 1, wherein the monitor device, when the first sensor state is the second state, is configured to:
determine if the first criterion is satisfied; and
in accordance with the first criterion being satisfied, setting the first sensor state to the first state.

12. The monitor device according to claim 1, wherein to determine a second sensor state comprises:
setting the second sensor state to a default state;
determining if a first criterion is satisfied;
in accordance with the first criterion being satisfied, setting the second sensor state to a first state;
determining if a second criterion is satisfied; and
in accordance with the second criterion being satisfied, setting the second sensor state to a second state.

13. The monitor device according to claim 1, wherein to output a first sensor state identifier indicative of the first sensor state and a second sensor state identifier indicative of the second sensor state comprises transmitting the first sensor state identifier and the second sensor state identifier to the accessory device.

14. A method of operating a monitor device for a personal care system, the method comprising:
obtaining first sensor data from a first sensor of a personal care appliance of the personal care system;
obtaining second sensor data from a second sensor of the personal care appliance;
determining a first sensor state of the first sensor based on the first sensor data, the determining comprising:
setting the first sensor state to a default state;
determining if a first criterion is satisfied;
in accordance with the first criterion being satisfied, setting the first sensor state to the first state;
determining if a second criterion is satisfied; and
in accordance with the second criterion being satisfied, setting the first sensor state to a second state;
determining a second sensor state of the second sensor based on the second sensor data; and
outputting a first sensor state identifier indicative of the first sensor state and optionally a second sensor state identifier indicative of the second sensor state.

15. An accessory device for a personal care system, the accessory device comprising:
a processor;
a memory connected to the processor; and
an interface configured to connect the accessory device to a monitor device of the personal care system, the interface comprising a transceiver module connected to the processor, wherein the accessory device is configured to:
obtain a first sensor state identifier indicative of a sensor state of a first sensor of personal care appliance of the personal care system, wherein the sensor state of the first sensor is:
set to a first sensor state in accordance with satisfaction of a first criterion,
set to a second sensor state in accordance with satisfaction of a second criterion, or
set to a default state;
obtain a second sensor state identifier indicative of a sensor state of a second sensor of the personal care appliance;
determine an operating state of the personal care appliance based on the first sensor state identifier and the second sensor state identifier; and
communicate the operating state of the personal care appliance via the interface.

\* \* \* \* \*